(12) United States Patent
Niwano et al.

(10) Patent No.: US 6,686,986 B2
(45) Date of Patent: Feb. 3, 2004

(54) IN PLANE SWITCHING LIQUID CRYSTAL DISPLAYING APPARATUS FOR IMPROVING LUMINANCE

(75) Inventors: Yasunori Niwano, Chiyoda-ku (JP); Yuichi Masutani, Chiyoda-ku (JP); Ken Nakashima, Chiyoda-ku (JP); Yuuzou Oodoi, Chiyoda-ku (JP); Kazuhiro Kobayashi, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/200,762

(22) Filed: Jul. 24, 2002

(65) Prior Publication Data

US 2002/0186338 A1 Dec. 12, 2002

Related U.S. Application Data

(62) Division of application No. 09/110,076, filed on Jul. 2, 1998, now Pat. No. 6,452,656.

(30) Foreign Application Priority Data

Oct. 16, 1997 (JP) .............................................. 9-283834

(51) Int. Cl.[7] ........................ G02F 1/1343; G02F 1/136
(52) U.S. Cl. ............................. 349/143; 349/43; 349/38
(58) Field of Search ............................. 349/141, 38, 43

(56) References Cited

U.S. PATENT DOCUMENTS

| | | | | |
|---|---|---|---|---|
| 5,796,448 A | * | 8/1998 | Kim | 349/39 |
| 5,835,169 A | * | 11/1998 | Kwon et al. | 349/38 |
| 5,995,182 A | * | 11/1999 | Watanabe et al. | 349/110 |
| 6,069,678 A | * | 5/2000 | Sakamoto et al. | 349/141 |
| 6,452,656 B2 | * | 9/2002 | Niwano et al. | 349/141 |

* cited by examiner

Primary Examiner—Julie Ngo
(74) Attorney, Agent, or Firm—Oblon, Spivak, McClelland, Maier & Neustadt, P.C.

(57) ABSTRACT

An IPS liquid crystal displaying apparatus includes: a TFT array substrate, an opposite substrate opposed to the TFT array substrate and liquid crystal interposed between the TFT array substrate and the opposite substrate, wherein the TFT array substrate is composed of a glass substrate, a gate insulating film formed on the glass substrate, a possivation film formed on the gate insulating film, a plurality of scanning lines for transmitting a scanning signal, a plurality of signal lines for transmitting an image signal, a plurality of pixels arranged in grid like pattern by crossing the plurality of scanning lines with the plurality of signal lines, a plurality of TFTs implementing switching operation of the image signal on the basis of the scanning signals, a plurality of driving electrodes connected with the TFT, a plurality of opposite electrodes arranged in such a manner that each of the plurality of opposite electrodes is opposed to each of the driving electrodes, and a plurality of common lines for mutually connecting each of the opposite electrode of one of the plurality of pixels with the other one of the plurality of pixels, wherein the TFT array substrate is formed on the passivation film, the passivation film being different from a layer provided with the driving electrode and the opposite electrode.

1 Claim, 28 Drawing Sheets

FIG. 7a
FIG. 7b
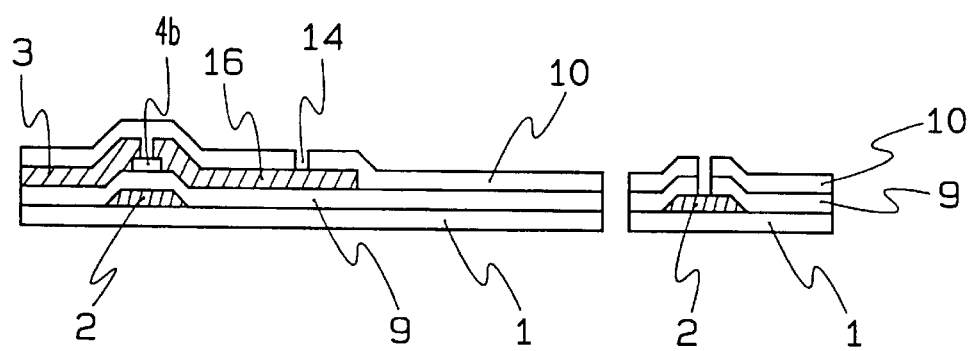
FIG. 8a
FIG. 8b
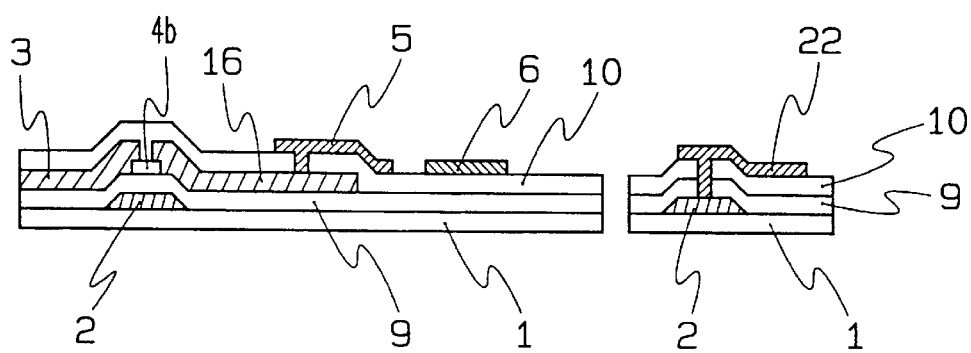

FIG. 14a
FIG. 14b
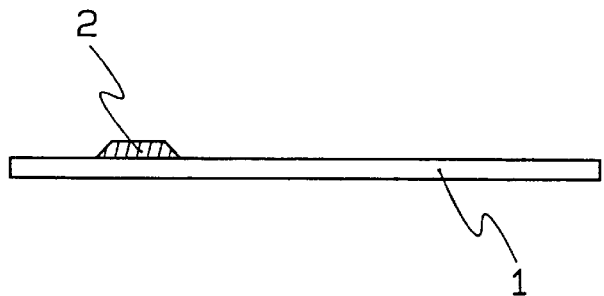 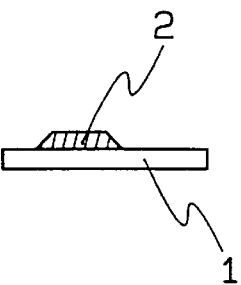
FIG. 15a
FIG. 15b
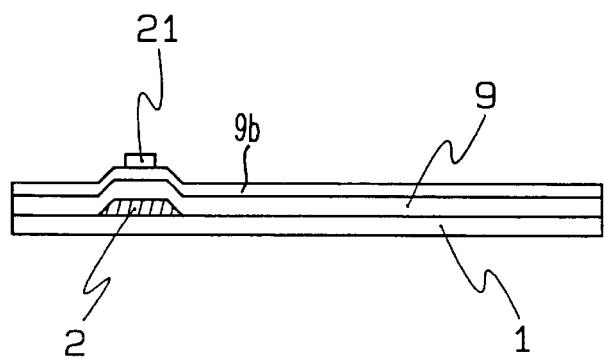 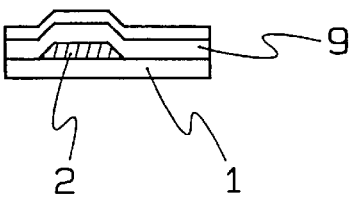
FIG. 16a
FIG. 16b
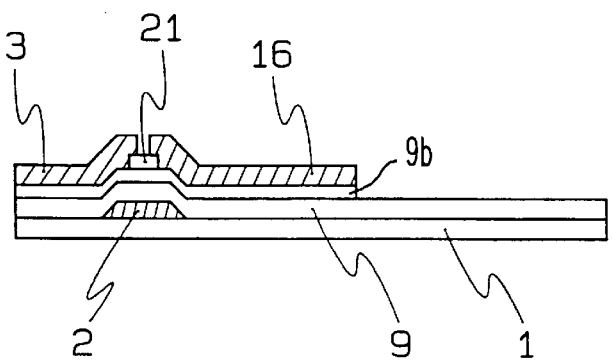 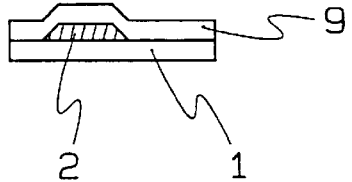

FIG. 20a FIG. 20b
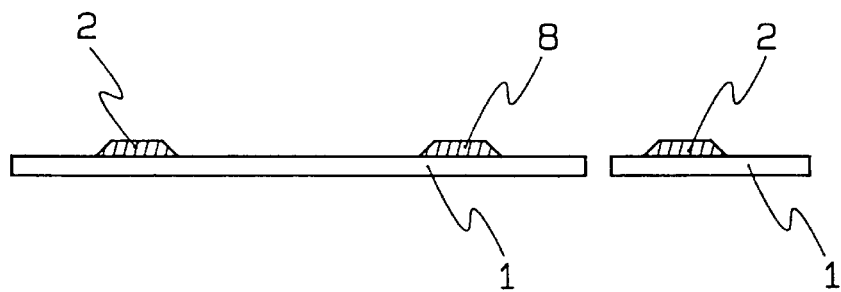 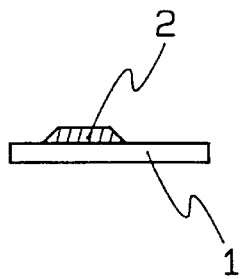
FIG. 21a FIG. 21b
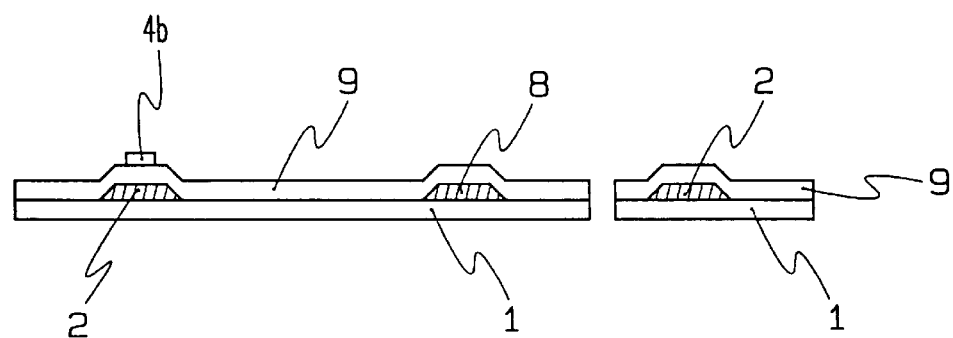 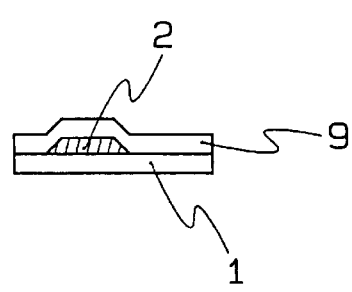
FIG. 22a FIG. 22b
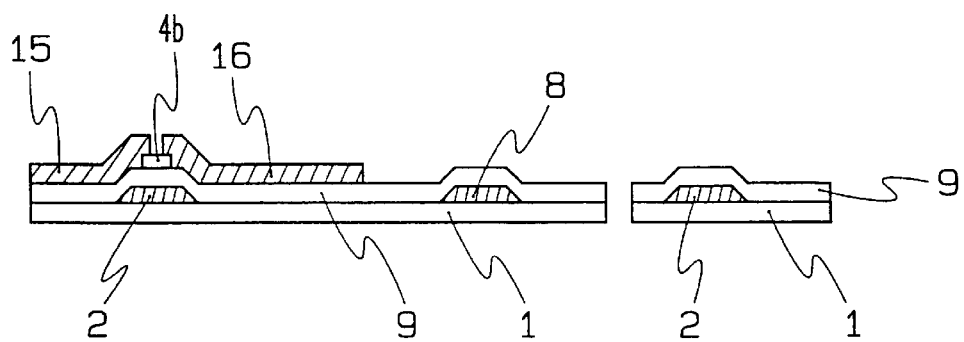 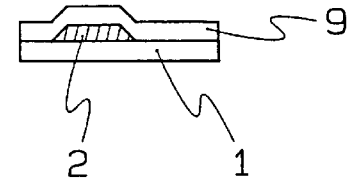

FIG. 37a
FIG. 37b
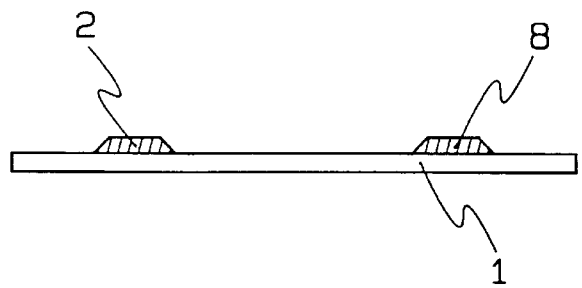
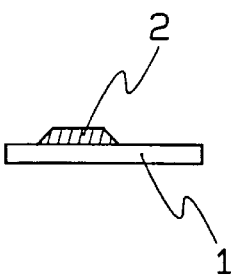
FIG. 38a
FIG. 38b
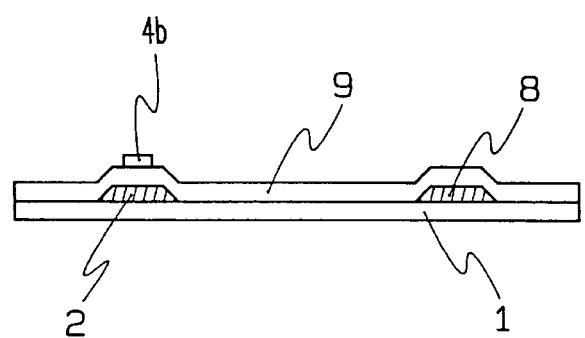
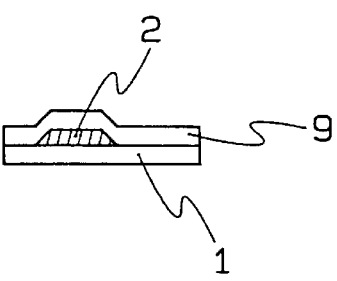
FIG. 39a
FIG. 39b
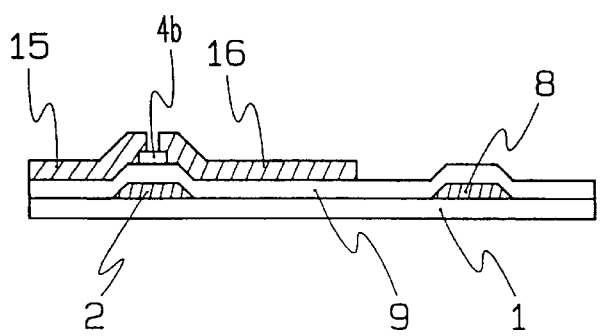
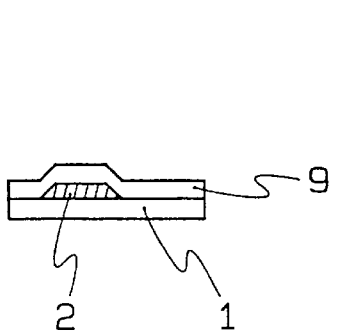

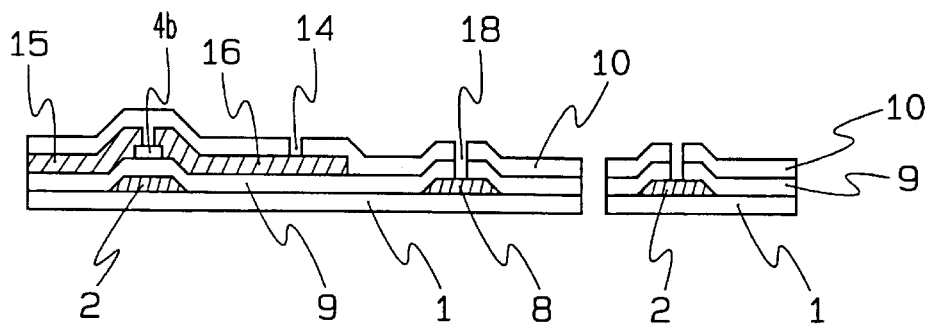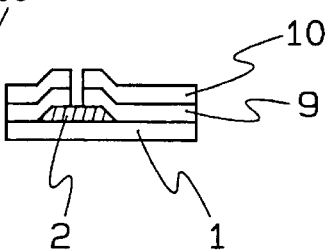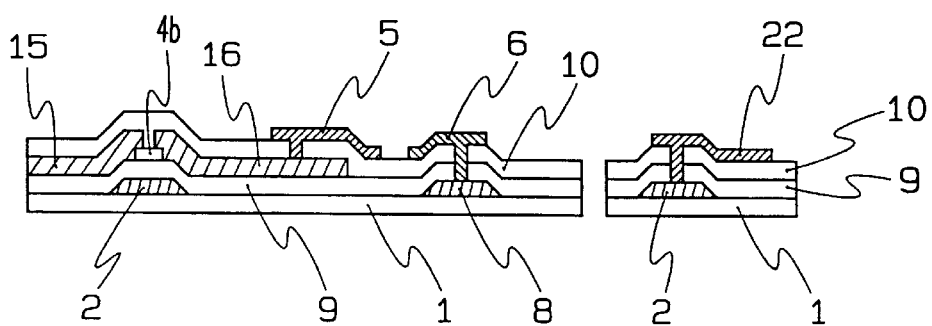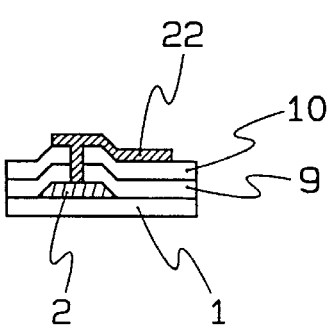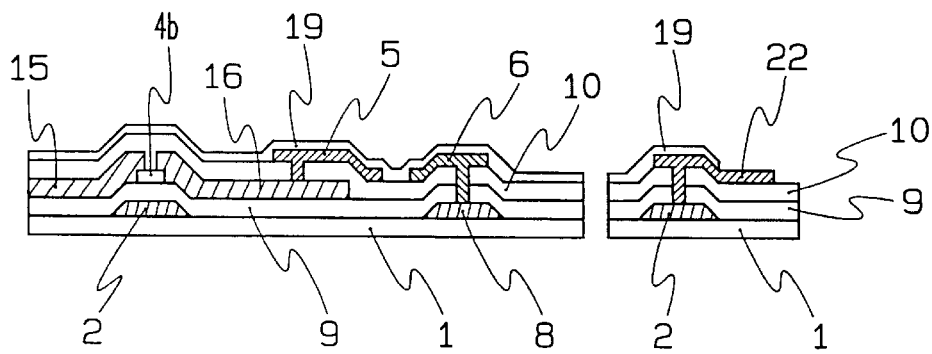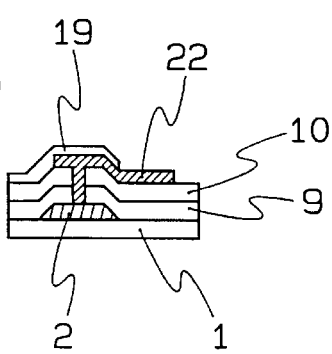

FIG. 43a
BACKGROUND ART
FIG. 43b
BACKGROUND ART
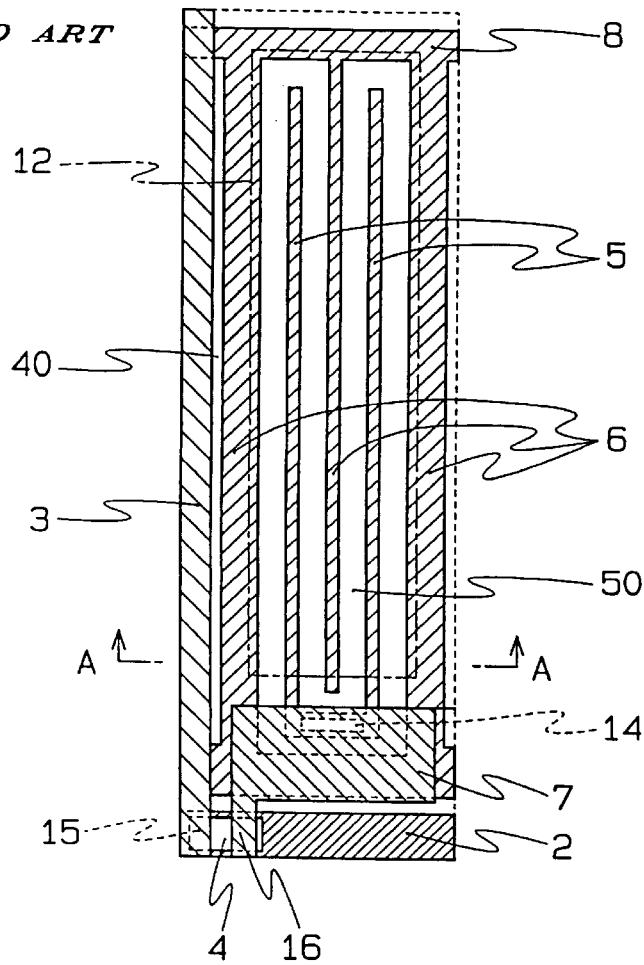
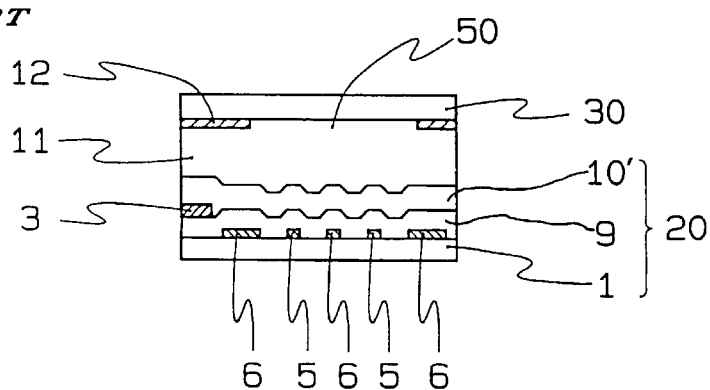

IN PLANE SWITCHING LIQUID CRYSTAL DISPLAYING APPARATUS FOR IMPROVING LUMINANCE

BACKGROUND OF THE INVENTION

The present invention relates to an IPS (In Plane Switching) liquid crystal displaying apparatus by generating an electric field parallel to an array substrate to drive the liquid crystal. More particularly, the present invention relates to a construction of a highly bright liquid crystal displaying apparatus increased in aperture ratio by reducing influences of the leakage of electric field from a signal line, thereby reducing the light shielding area.

In an active matrix type liquid crystal displaying apparatus, an IPS system where the direction of the electric field to be applied on the liquid crystal is made parallel to the array substrate is mainly used as a method of obtaining a wider viewing angle (for example, see Japanese Unexamined Patent Publication No. 254712/1996). It is reported that this system enables to remove the almost all of the change in the contrast and the inversion of the gradation level in changing the viewing-angle direction (see, for example, AsiaDisplay, 95, page, 577 to 580 by M. Oh-e, and others).

A construction of one pixel of the conventional IPS liquid crystal displaying apparatus is depicted in FIGS. 43a and 43b. FIG. 43a is the plain view thereof. FIG. 43b is a sectional view taken along a line A—A of FIG. 43a. FIG. 44 is a circuit diagram showing an equivalent circuit of one pixel of the pixel electrode of an IPS liquid crystal displaying apparatus. FIG. 45 is a circuit diagram for illustrating the circuit of the IPS liquid crystal displaying apparatus. Referring to FIGS. 43a and 43b, reference numeral 1 denotes a glass substrate, numeral 2 denotes a scanning line, numeral 3 denotes a signal line, numeral 4 denotes a thin film transistor (TFT), numeral 5 denotes a driving electrode, numeral 6 denotes an opposite electrode, numeral 7 denotes an electrode for forming the storage capacitance, numeral 8 denotes common line, numeral 9 denotes a gate insulating film, numeral 10' denotes a passivation film, numeral 11 denotes a liquid crystal, numeral 12 denotes a BM (black matrix), numeral 14 denotes a contact hole, numeral 15 denotes a source electrode, and numeral 16 denotes a drain electrode. Numeral 20 denotes an array substrate comprising glass substrate 1, a signal line 3, a driving electrode 5, an opposite electrode 6. Numeral 30 denotes an opposite substrate arranged opposite to the array substrate 20. Numeral 40 denotes a slit which is a gap between the signal line 3 and the opposite electrode 6, and numeral 50 denotes an opening. Referring to FIG. 44 and FIG. 45, the same reference numerals as those of FIGS. 43a and 43b depict the same parts or its equivalents as those of FIGS. 43a and 43b.

The construction and operation of the conventional IPS liquid crystal displaying apparatus will be described according to FIGS. 43a and 43b, FIG. 44 and FIG. 45. Referring to FIG. 45, a plurality of grid shaped pixels encircled by the scanning line 2 and the signal line 3 can be made by crossing, at an approximately right angle between a scanning line 2 connecting the scanning line driving circuit 102 and a signal line 3 connecting the signal line driving circuit 101. A TFT (Thin Film Transistor) is provided at each intersection point between a signal line and a scanning line for forming the grid shaped pixel. Numeral 103 denotes a circuit for common lines.

This condition is shown by an equivalent circuit in FIG. 44. The TFT 4 is a semiconductor element having three electrodes of a gate electrode, a source electrode 15 and a drain electrode 16. The gate electrode is connected with a scanning line 2 extended from the scanning line driving circuit. The source electrode 15 is connected with a signal line 3 connected with the signal line driving circuit. The remaining drain electrode 16, connected with the driving electrode 5, drives the liquid crystal by an electric field caused between the driving electrode 5 and the opposite electrode 6. Numeral 7 denotes a storage capacitance for storing the electric charge between the driving electrode 5 and the opposite electrode 6. The construction of one pixel will be described in accordance with FIG. 43a and FIG. 43b. In a pixel formed through the crossing between the scanning line 2 and the signal line 3 are provided a driving electrode 5 for driving the liquid crystal layer, an opposite electrode 6 and a TFT 4. In the TFT 4 there are three electrodes. The scanning line 2 connected with the scanning line driving circuit shown in FIG. 45 is connected with the gate electrode of the TFT 4, so as to apply the scanning signal, the scanning line driving circuit outputs, upon the gate electrode of the TFT 4.

The signal line 3 connected with the signal line driving circuit is connected with the source electrode 15 of the TFT 4 to transmit the image signal the signal line driving circuit outputs. The drain electrode 16 of the TFT 4 is connected with the driving electrode 5 through a contact hole 14 as shown in FIG. 43a. In the same pixel, an opposite electrode 6 is provided to be engaged face to face with the driving electrode 5. The opposite electrode 6 is connected with the common line 8. The common line 8 is connected with each opposite electrode 6 provided in each pixel on the TFT array substrate 20.

The sectional construction of the picture section will be described in accordance with FIG. 43b. A driving electrode 5 and an opposite electrode 6 are respectively formed on the glass substrate 1. Although not shown in FIG. 43b, the scanning line 2 and the common line 8 are also formed in the same layer as that of the driving electrode 5 and the opposite electrode 6. The gate insulating film 9 is laminated on a glass substrate by covering the driving electrode, the opposite electrode, the scanning line and the common line, and the signal line 3 is formed on the gate insulating film 9. Although not shown in FIG. 43b, the storage capacitance forming electrode 7 is also formed in the same layer as that of the signal line 3. A passivation film 10' is laminated further on the signal line 3, so as to form the TFT array substrate 20. The TFT array substrate 20 and the opposite substrate 30 is superposed. The IPS liquid crystal displaying apparatus is made with a liquid crystal 11 being sealed between the TFT array substrate 20 and the opposite substrate 30.

The IPS liquid crystal displaying apparatus is a system where the electric filed is caused along the surface of the TFT array substrate 20 between the driving electrode 5 and the opposite electrode 6 provided on the TFT array substrate 20. Thus, the opposite substrate 30 is a no-electrode substrate having no electrode. On the opposite substrate 30 there is provided a BM 12 which is a light shielding film. Although not shown, the light leaked from a slit 40 of FIG. 43a is to be shielded with a back light, provided on the under side of the TFT array substrate, as a light source in FIG. 43b.

An area surrounded by broken lines shown by 50, defining an opening per pixel, functions as a role of a window through which light passes with the back light as a light source. But the light from the back light is shielded by a driving electrode 5, an opposite electrode 6, a black matrix 12 and so on, thereby influencing upon the picture quality of the liquid crystal display. Thus, a problem is to reduce the ratio, in area, of the driving electrode 5, the opposite electrode 6, the black matrix 12 and so on to be occupied in the area of the opening 50.

The above description is given about the construction of the pixel of the conventional IPS liquid crystal displaying apparatus about FIGS. 43a and 43b, FIG. 44 and FIG. 45. The operation of the IPS liquid crystal displaying apparatus will be described. The gate electrode is provided in each pixel. The gate electrode of the TFT is connected with the scanning line 2. The source electrode 15 is connected with the signal line 3. The drain electrode 16 is connected with the driving electrode 5. Such a TFT 4 is a semiconductor switching element, which controls the driving operation of the liquid crystal of each pixel. When a scanning signal is applied, through the scanning line 2 from the scanning line driving circuit, upon the gate electrode of the TFT 4, all the TFT 4 of this horizontal line is respectively switched on.

When the gate electrode is switched on, the image signal transmitted from the signal line driving circuit flows to the drain electrode 16 by way of the source electrode 15 and is stored in the driving electrode 5 connected with the drain electrode 16. Electric charge applied in the driving electrode 5 is stored with respect to the opposite electrode 6 and the gate electrode is turned on again. The electric charge of that time is stored before the new image signal electric charge is applied. The driving electrode 5 and the opposite electrode 6 function as a capacitor in that the electric charge is stored while the gate electrode is on, and the stored electric charge is held as it is when the gate electrode is turned off. The storage capacitance 13 shown in FIG. 44 increases the accumulating force of the capacitance. The storage capacitance 13 is formed by the vertical lamination of the storage capacitance electrode 7 and the common line 8 through the gate insulating film 9.

In the conventional IPS liquid crystal displaying apparatus shown in FIGS. 43a and 43b, between the signal line 3 provided in the side end portion of one pixel and the opposite electrode 6 formed in parallel to the signal line 3 is caused an electric field due to the potential difference between the signal line 3 and the opposite electrode 6. FIG. 46 is a view showing influences to be applied, upon the electric field to be caused between the driving electrode 5 and the opposite electrode 6, by the electric field caused between the signal line 3 and the opposite electrode 6 of the conventional IPS liquid crystal displaying apparatus, which has the TFT array substrate where the driving electrode 5 and the opposite electrode 6 are formed in the layer lower than the signal line 3. In FIG. 46, changes in the potential caused between the driving electrode 5 and the opposite electrode 6 is obtained as a simulator. In FIG. 46, the electric potential in the window upper portion or lower portion is calculated when a white window has been displayed in the half tone of the relative transmission factor 50%.

It is desirable to correctly drive the liquid crystal to have the driving electrode 5 between two opposite electrodes 6 so that the potential distribution is symmetrical around the driving electrode 5. It is found out from FIG. 46 that the potential distribution of an area near the signal line 3 of the opening 50 is subjected to the influences of the leakage of electric field caused between the signal line 3 and the opposite electrode 6, thus resulting in asymmetric potential distribution. The electric field is caused along the surface of the glass substrate 1, thus causing a problem like crosstalk. For example, when a white window is displayed in such black displaying as shown in FIG. 47, there prises a problem on the display called "longitudinal crosstalk" where the vertical luminance of the window portion changes with respect to the other black displaying portion.

An example in a case of a normally black mode (wherein the displaying becomes black with the voltage being not applied) will be described in FIG. 44. When such a window pattern in FIG. 47 is displayed, the same voltage as that of the opposite electrode 6 is applied during the selecting period of the black displaying portion 111 upon the signal line 3 of the pixels of the window and its upper and lower portions during the picture face, and a voltage necessary to the white displaying 113 is applied during the selecting period of the white displaying portion 111.

The voltage of a value where the absolute value of the electric potential value between the electrodes has been averaged by hour is applied upon the liquid crystal 11 effectively. Therefore, for example, when the black displaying and the white displaying are equal in the selecting period, the effective potential equal to the half tone display 112 is applied upon these pixels between the signal line 3 and the opposite electrode 6. At this time, the liquid crystal on the slit 40 between the signal line 3 and the opposite electrode 6 becomes a transmission mode by the electric field to horizontal to the glass substrate 1 to be caused between the signal line 3 and the opposite electrode 6. The electric field to be caused by the electrical potential difference between the signal line 3 and the opposite electrode 6 gives influences even upon the electric field between the driving electrode 5 and the opposite electrode 6, so as to change the liquid crystal of the black displaying portion into the transmission mode. As a result, the crosstalk is caused.

In order to prevent such longitudinal crosstalk from being caused, the leaking light transmitting through the slit 40 between the signal line 3 and the opposite electrode 6 is required to be shielded by the BM 12 formed on the opposite substrate 30 and to prevent the electric field, caused between the signal line 3 and the opposite electrode 6, from being interfered with the electric field between the driving electrode 5 and the opposite electrode 6 with the driving electrode 5 and the opposite electrode 6 spaced apart from the opposite electrode 6 of the side end portion on the side of the opening 50, and the signal line 3. When the driving electrode 5 and the opposite electrode 6 are separated from the signal line 3 to make larger the width of the opposite electrode 6 adjacent to the signal line 3, and the aperture ratio of the opening 50, namely, a portion to be occupied by an area where the area of the driving electrode 5 and the opposite electrode 6 and so on is subtracted from the area of the opening 50 with respect to the area of the opening 50 surrounded with broken lines in FIG. 4a, becomes smaller to make the picture quality worse. In order to develop the high picture quality liquid crystal displaying apparatus, it is necessary to shielded the light, without reducing the aperture ratio, the electric field to be caused between the signal line 3 and the opposite electrode 6 adjacent to the signal line 3.

As clear from FIG. 43b, level of the surface of the passivation film 10' which is an upper layer film of the array substrate 20 is not flat (level difference), and the gap between the surface of the passivation film 10' and the opposite substrate 30 is not flat. Thus, uneven luminance is likely to be caused, causing the picture quality worse. The level difference provided makes not only the array substrate inferior due to crack, but also disconnects the wiring on the array substrate due to the level difference portion in the manufacturing operation with a problem in improving the yield factor and reliability of the product.

Further, in accordance with the conventional IPS liquid crystal displaying apparatus, picture quality is deteriorated by light leaking transmitted from the slit 40, the light being emitted by a back light serving as a light sourse. In order to shield the leaked light, the black matrix 12 is provided on the opposite substrate 30. However, when the TFT array substrate 20 is superposed with the opposite substrate 30, there might be generated error. Then, the black matrix 12 has been formed in such a manner as to be somewhat larger with some margin for the purpose of taking the error into consideration. However, there arises such a problem in which opening ratio is lowered when shieding effect is enhanced by making the black matrix 12 large.

The first object of the present invention is to solve the problems mentioned above, and to provide an IPS liquid crystal displaying apparatus causing electric field parallel to a glass substrate, the IPS liquid crystal displaying apparatus capable of improving shielding effect against electric field leaking from the signal line, making the opening wide (that is, making opening ratio high) by lowering the light shielding area. Further, the second object of the present invention is to provide a high quality IPS liquid crystal displaying apparatus in which cost for producing the apparatur is decreased by preventing the lines from disconnection thereby improving the yield factor.

SUMMARY OF THE INVENTION

The IPS liquid crystal displaying apparatus of the present invention comprises:

a TFT array substrate, an opposite substrate opposed to the TFT array substrate and liquid crystal interposed between the TFT array substrate and the opposite substrate, wherein the TFT array substrate is composed of a glass substrate, a gate insulating film formed on the glass substrate, a possivation film formed on the gate insulating film, a plurality of scanning lines for transmitting a scanning signal, the plurality of scanning lines being formed on the glass substrate, a plurality of signal lines for transmitting an image signal, the plurality of signal lines being formed on the gate insulating film, a plurality of pixels arranged in grid like pattern by crossing the plurality of scanning lines with the plurality of signal lines, a plurality of TFTs implementing switching operation of the image signal on the basis of the scanning signals, a plurality of driving electrodes connected with the TFT, a plurality of opposite electrodes arranged in such a manner that each of the plurality of opposite electrodes is opposed to each of the driving electrodes, and a plurality of common lines for mutually connecting each of the opposite electrode of one of the plurality of pixels with the other one of the plurality of pixels, wherein the TFT array substrate is formed on the passivation film, the passivation film being different from a layer provided with the driving electrode and the opposite electrode.

The IPS liquid crystal displaying apparatus of the present invention is provided with a driving electrode for driving the liquid crystal layer by causing the electric field parallel to the TFT array substrate face, the driving electrode being connected with the TFT, and an opposite electrode connected with a common line. At least the opposite electrode has a TFT array substrate formed on the passivation film, different from a layer where the signal line is formed.

The IPS liquid crystal displaying apparatus of the present invention has a TFT array substrate having an opposite electrode formed to cover one portion of the signal line or all the portion of the signal line.

The IPS liquid crystal displaying apparatus of the present invention has a TFT array substrate having an opposite electrode formed to cover one portion of the scanning line or all the portion thereof, having at least an opposite electrode in a layer different from the scanning line.

The IPS displaying apparatus of the present invention has a common line and a scanning line on the same layer, and a signal line provided on the gate insulating film.

The IPS liquid crystal displaying apparatus of the present invention has a TFT array substrate with the surface of the passivation film being approximately flat in shape.

The IPS liquid crystal displaying apparatus of the present invention has a light shielding means formed to have the signal line and the opposite electrode superposed.

The IPS displaying apparatus of the present invention has a TFT array substrate formed, to have for superposition in different layers, a TFT for switching the picture image signal in accordance with the scanning signal, a driving electrode for accumulating, while the switch of the TFT is off, the electric load stored when the switch of the TFT is on, and a storage capacitance increasing electrode for reinforcing the capacitance of the driving electrode.

BRIEF EXPLANATION OF THE DRAWINGS

FIGS. 4a, 4b, 5a, 5b, 6a, 6b, 7a, 7b, 8a and 8b depict is a process flow of a TFT array substrate of an IPS liquid crystal displaying apparatus of Embodiment 1 of the present invention;

FIGS. 14a, 14b, 15a, 15b, 16a, 16b, 17a, 17b, 18a and 18b depict is a still another process flow of a TFT array substrate of an IPS liquid crystal displaying apparatus of Embodiment 1 of the present invention;

FIGS. 20a, 20b, 21a, 21b, 22a, 22b, 23a, 23b, 24a and 24b depict a process flow of a TFT array substrate of an IPS liquid crystal displaying apparatus of Embodiment 2 of the present invention;

FIGS. 37a, 37b, 38a, 38b, 39a, 39b, 40a, 40b, 41a, 41b, 42a and 42b depict a process flow of a TFT array substrate of an IPS liquid crystal displaying apparatus of Embodiment 9 of the present invention;

FIGS. 43a and 43b are a plain view and a sectional view showing the construction of one pixel of the conventional IPS liquid crystal displaying apparatus;

DETAILED DESCRIPTION OF THE INVENTION

Embodiment 1

Figure 1:
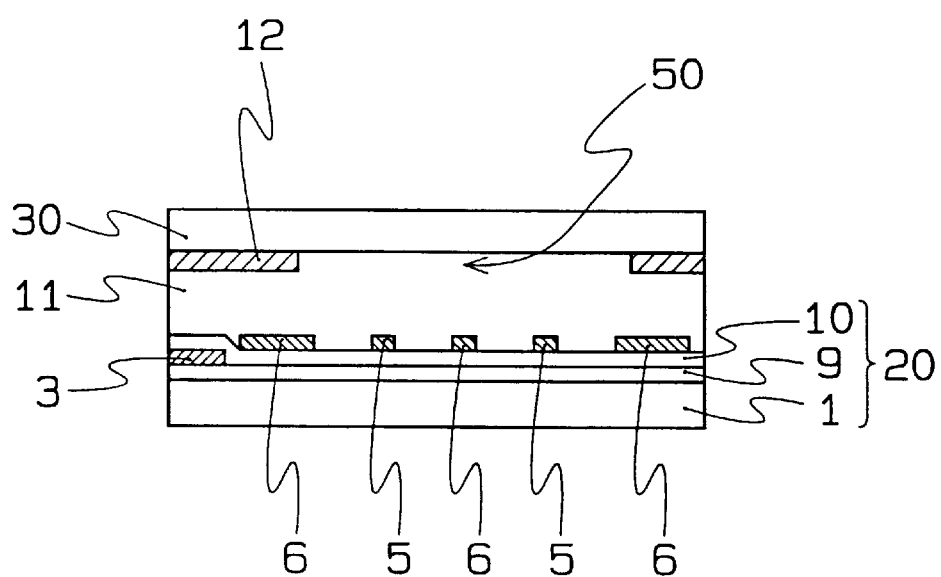
FIG. 1 is a sectional view showing the construction of one pixel of an IPS liquid crystal displaying apparatus of Embodiment 1 of the present invention.
Figure 2:
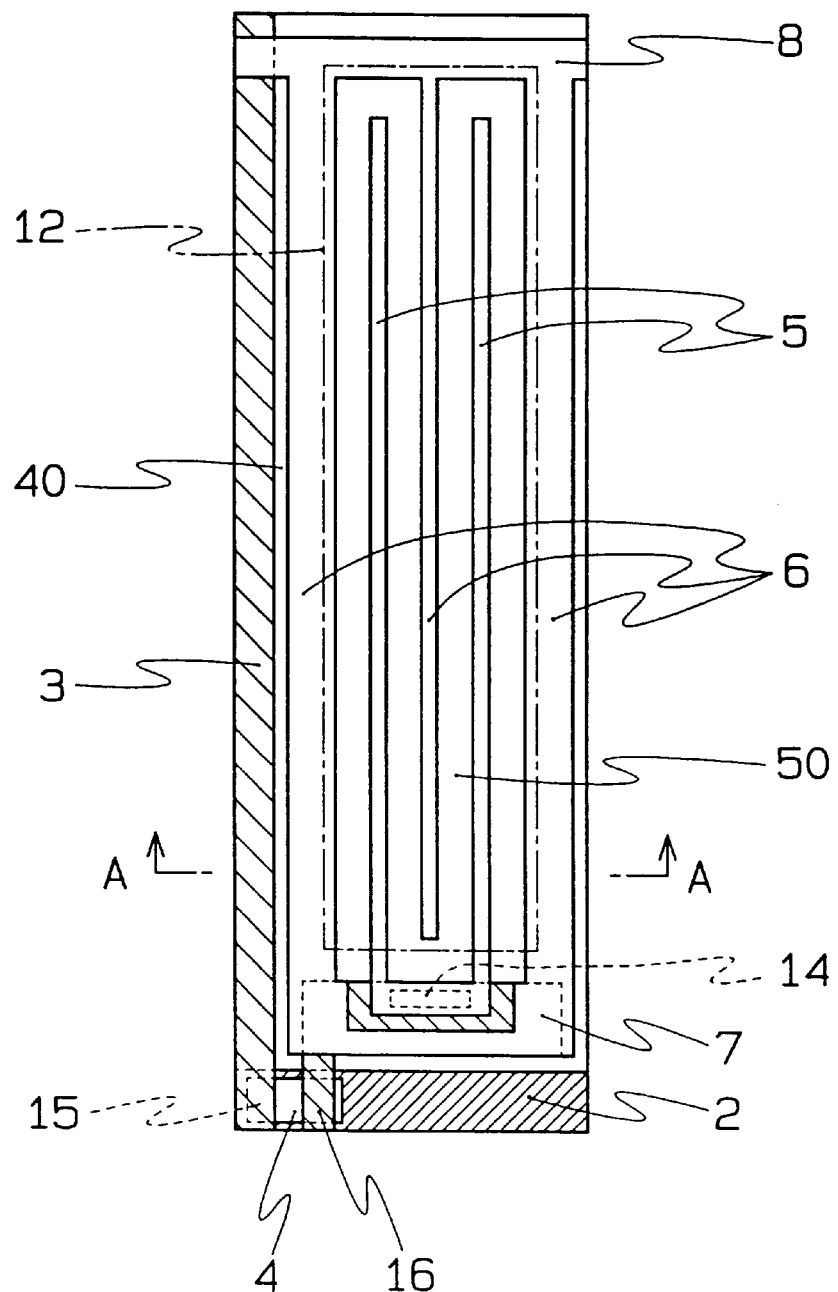
FIG. 2 is a plain view showing the construction of one pixel of an IPS switching type liquid crystal displaying apparatus of Embodiment 1 of the present invention.
Figure 3A:
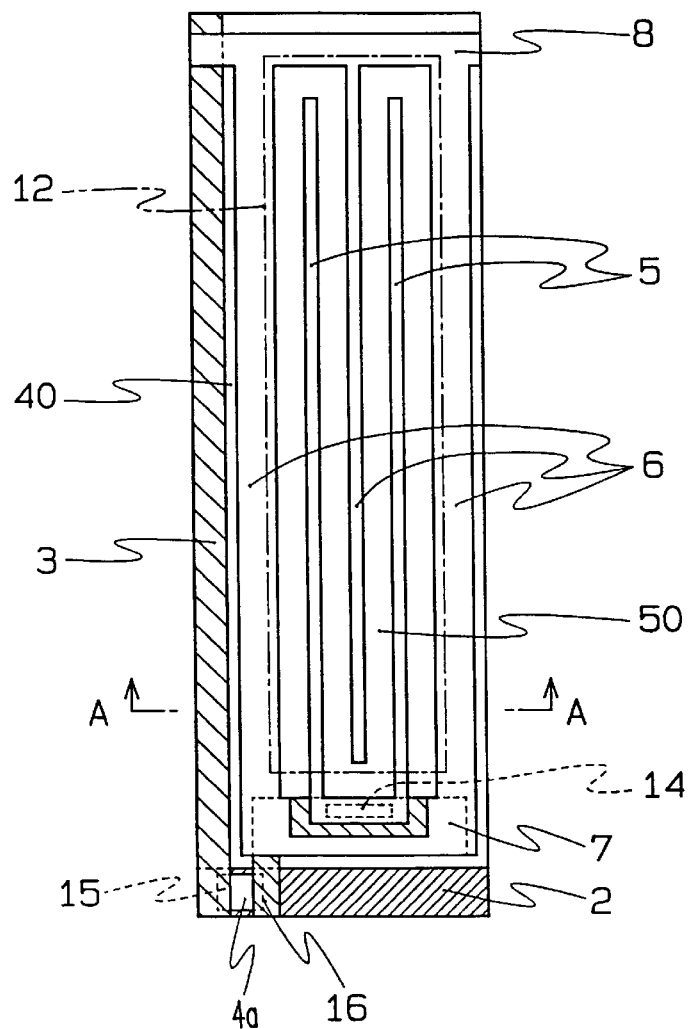
FIGS. 3a and 3b are a plain view and a sectional view showing the construction of one pixel of an IPS liquid crystal displaying apparatus of the embodiment 1 of the present invention.
Figure 3B:
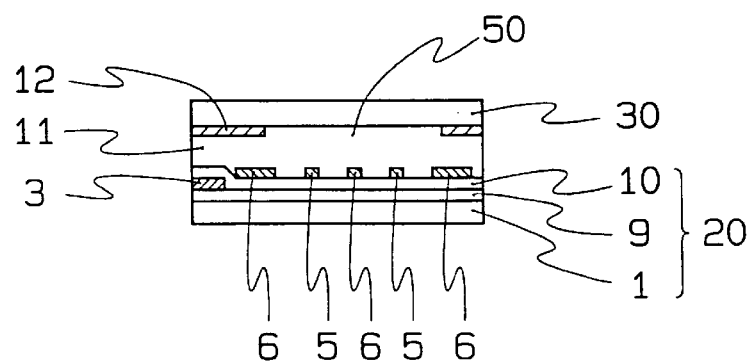
Figure 4A:
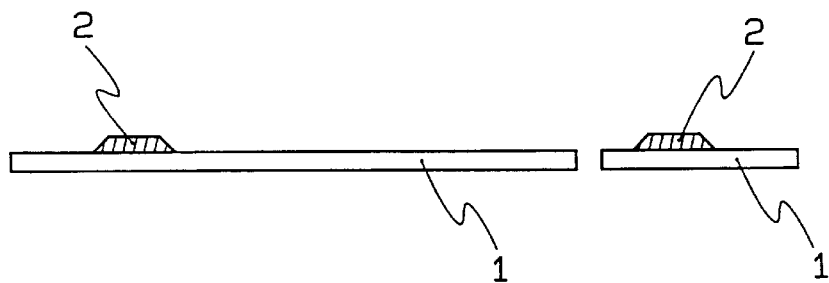
Figure 4B:
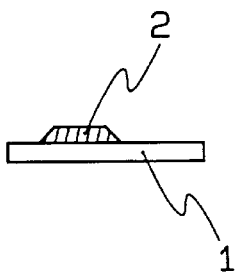
Figure 5A:
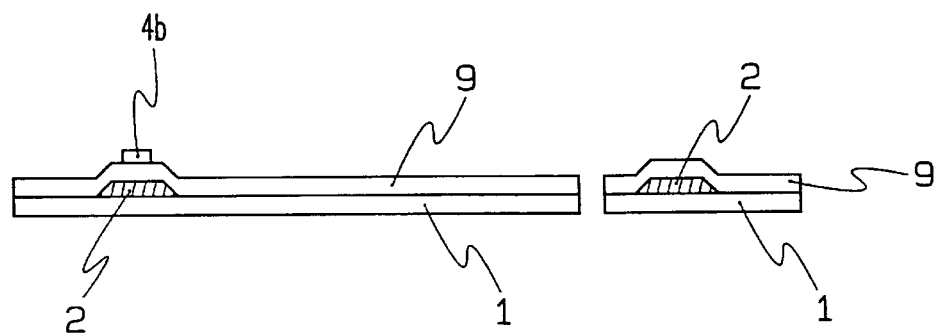
Figure 5B:
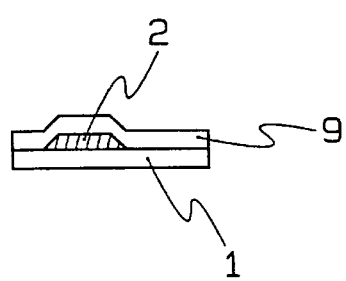
Figure 6A:
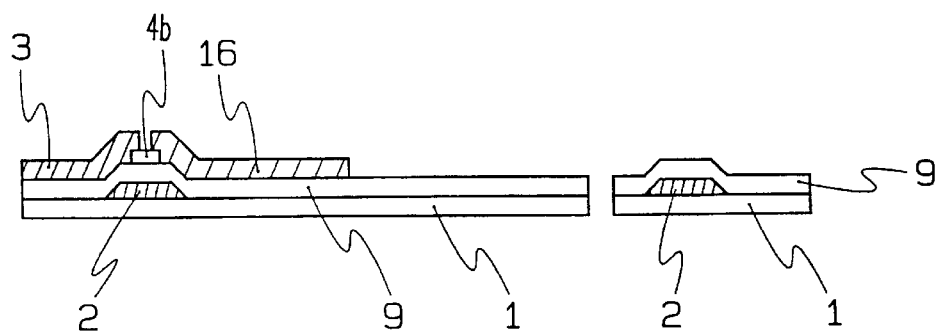
Figure 6B:
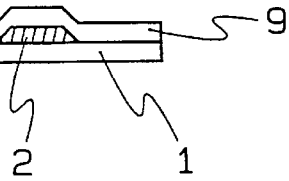
Figure 9A:
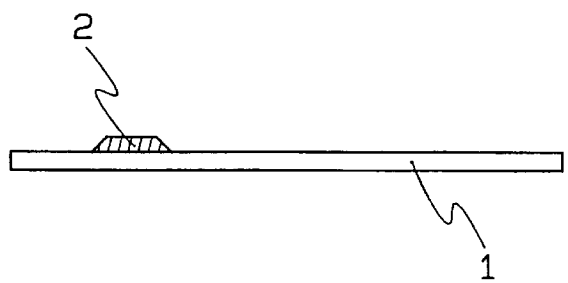
FIGS. 9a, 9b, 10a, 10b, 11a, 11b, 12a, 12b, 13a and 13b depict is another process flow of a TFT array substrate of an IPS liquid crystal displaying apparatus of Embodiment 1 of the present invention.
Figure 9B:
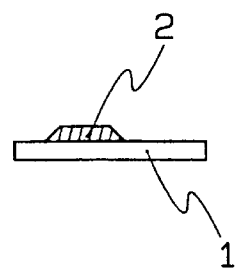
Figure 10A:
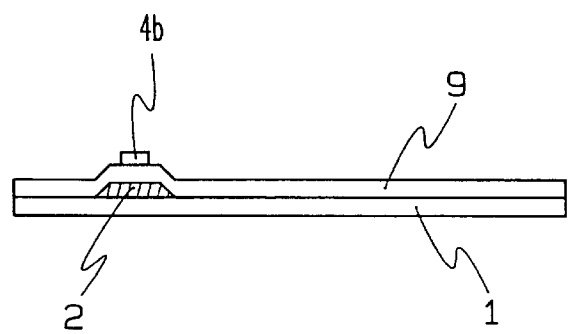
Figure 10B:
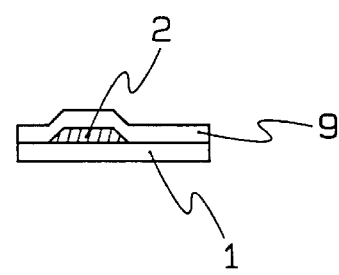
Figure 11A:
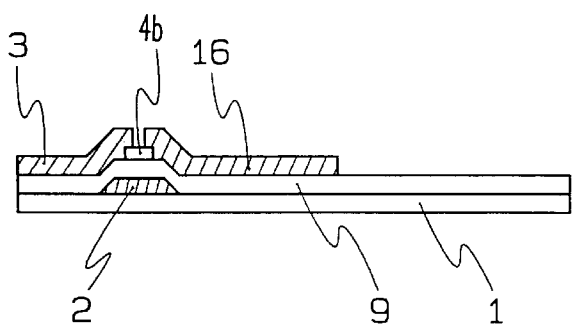
Figure 11B:
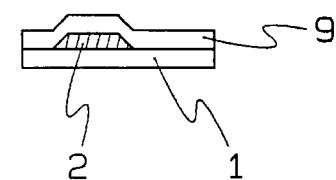
Figures 12A, 12B:
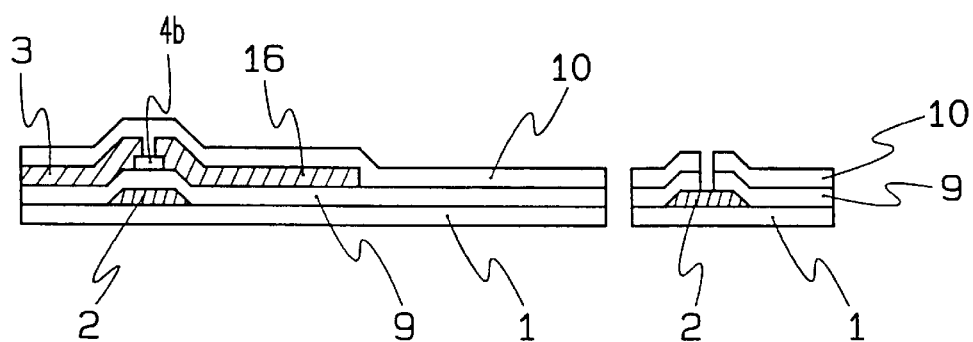
Figures 13A, 13B:
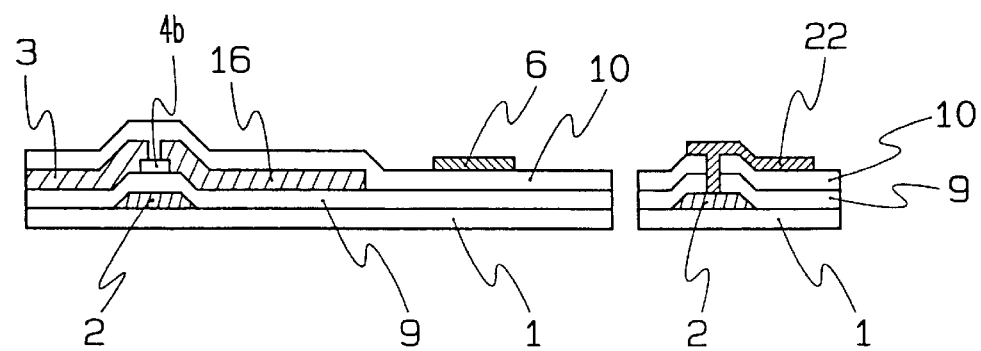
Figures 17A, 17B:
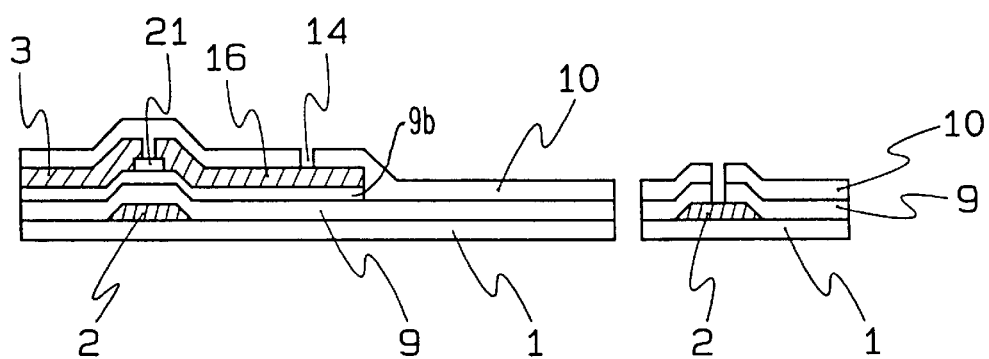
Figures 18A, 18B:
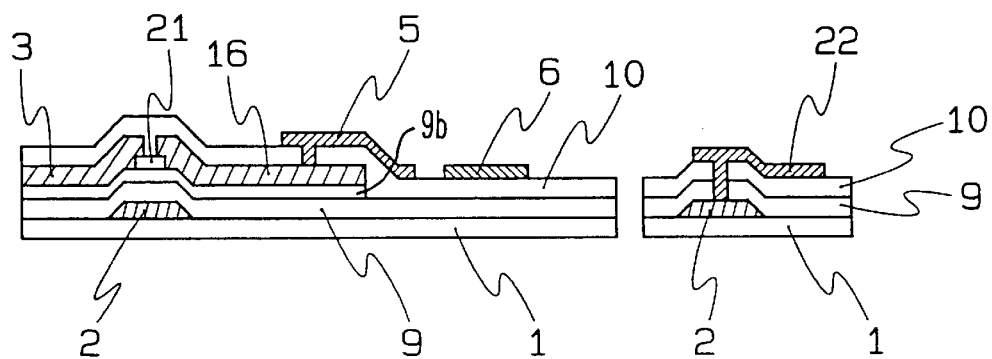

One embodiment of the present invention will be described in accordance with drawings. The reference numerals in Embodiment 1 are the same as those of the conventional reference numerals. FIG. 1 is a sectional view showing the construction of one pixel of the IPS type liquid crystal displaying apparatus in Embodiment 1 of the present invention. FIG. 2 is its plain view. FIG. 1 is a sectional view taken along a line of A—A in FIG. 2. Referring to the drawing, reference numeral 1 denotes a glass substrate, numeral 2 denotes a scanning line, numeral 3 denotes a signal line, numeral 4 denotes a TFT, numeral 5 denotes a driving electrode, numeral 6 denotes an opposite electrode, numeral 7 denotes an electrode for forming the storage capacitance, numeral 8 denotes a common line, numeral 9 denotes a gate insulating film, numeral 10 denotes a passivation film, numeral 11 denotes a liquid crystal, numeral 12 denotes a BM, numeral 14 denotes a contact hole, numeral 15 denotes a source electrode of the transistor, and numeral 16 denotes a drain electrode of the transistor. Numeral 20 denotes an array substrate comprising a glass substrate 1, a signal line 3, a driving electrode 5, an opposite electrode 6. Numeral 30 denotes an opposite substrate cerving as a displaying picture face arranged opposite to the array substrate 20. Numeral 40 denotes a slit which is a gap between the signal line 3 and the opposite electrode 6. Numeral 50 denotes an opening of a pixel. FIG. 3 depicts the construction of one pixel of the IPS type liquid crystal displaying apparatus when a channel passivation TFT 21 which is one type of a TFT 4 is provided as a TFT to be used in the IPS type liquid crystal displaying apparatus shown in FIG. 2. FIG. 3a is its plain view. FIG. 3b is a sectional view.

The construction of the pixel of the IPS type liquid crystal displaying apparatus will be described in accordance with FIG. 1 and FIG. 2. Referring to the drawings, numeral 1 denotes a glass substrate with a scanning line 2 being formed on the glass substrate 1. A gate insulating film 9 is laminated to cover the scanning line 2 and a signal line 3 is provided on the gate insulating film 9. A passivation film 10 is laminated on the signal line 3. A driving electrode 5 and an opposite electrode 6 are provided on the passivation film 10. The TFT array substrate 20 is made as described above. A substrate 30 which is provided to be opposed to the TFT array substrate 20 is an opposite substrate for grasping a liquid crystal 11 with respect to the TFT array substrate 20. The IPS liquid crystal displaying apparatus of the present invention causes an electric field along the surface of the TFT array substrate, and thereby to drive the liquid crystal 11 by controlling the direction of the electric field.

FIG. 2 is a plain view of an IPS liquid crystal displaying apparatus shown in FIG. 1. Referring to FIG. 2, numeral 2 denotes a scanning line and numeral 3 denotes a signal line. An area surrounded by the scanning line 2 and the signal line 3 becomes one pixel. Numeral 4 denotes a TFT provided in the intersection point between the scanning line 2 and the signal line 3. The gate electrode of three electrodes having the TFT 4 is connected with the scanning line 2, and the source electrode 15 is connected with the signal line 3. The drain electrode 16 of three electrodes having the TFT 4 is connected with the driving electrode 5 by a contact hole 14 in an upper layer through a passivation film 10 (not shown). An opposite electrode 6 which is provided opposite to be engaged with the driving electrode 5 is connected with the common line 8 of the same layer. The common line 8 not shown is connected with the opposite electrode 6 of the other adjacent pixel. The driving electrode 5, the opposite electrode 6, and the common line 8 are formed at the same time in a layer upper than the signal line 3.

Numeral 7 denotes storage capacitance for keeping the potential of the driving electrode 5. The opposite electrode 6 and the drain electrode 16 are laminated vertically. Numeral 40 denotes a slit between the signal line 3 and the opposite electrode 6. The BM 12 provided in the opposite substrate 30 shown in FIG. 1 shields the leakage light which transmits through the slit 40 with the back light as a light source. Numeral 50 denotes an opening. The larger the area of the opening becomes, the higher picture quality the liquid display can obtain. As the IPS liquid crystal displaying apparatus retains the electric charge stored in the driving electrode 5 connected with the drain electrode 16 of the TFT 4 and drives the liquid crystal 11 by causing the electric field along the surface of the glass substrate 1, the opposite substrate 30 is a no-electrode substrate not provided with an electrode. One example of the process flow of the TFT array substrate for composing the pixel of the IPS liquid crystal displaying apparatus in Embodiment 1 will be described.

FIGS. 4a, 4b, 5a, 5b, 6a, 6b, 7a, 7b, 8a and 8b depict a process flow of a TFT array substrate. FIGS. 9a, 9b, 10a, 10b, 11a, 11b, 12a, 12b, 13a and 13b depict another process flow of a TFT array substrate. FIGS. 14a, 14b, 15a, 15b, 16a, 16b, 17a, 17b, 18a and 18b depict still another process flow of a TFT array substrate. The left-hand side views of FIG. 4a through FIG. 18a show the TFT array substrate and the right-hand side views thereof show the terminal portions for embodying the scanning line 2 into the scanning line driving circuit. Referring to FIGS. 4a, 4b, 5a, 5b, 6a, 6b, 7a, 7b, 8a and 8b a step 1 (FIGS. 4a and 4b) forms a scanning line 2, of approximately 50 nm through 800 nm in film thickness, under the construction of any one of Cr, Al, Mo, Ta, Cu, Al—Cu, Al—Si—Cu, Ti, W, or of their alloy, or transparent materials such as ITO (Indium Tin Oxide) or the like or the laminated thereof. The scanning line 2 functions even as the gate electrode of the TFT 4. As an etching method in forming the scanning line 2 may be used an etching method as the section becomes rectangular although the taper etching which becomes trapezoidal in section is shown in FIGS. 4a, 4b, 5a, 5b, 6a, 6b, 7a, 7b, 8a and 8b.

In step 2 (FIGS. 5a and 5b), a gate insulating film 9 is accumulated to cover the scanning line 2, amorphous silicon with impurities such as amorphous silicon, phosphorus and so on being doped in it is continuously accommodated, then amorphous silicon is patterned and the TFT 4 is formed with a channel etch type. A gate insulating film 9 is proper to have approximately 200 nm through 600 nm in thickness by using a transparent insulating film such as silicon nitride, silicon oxide or the like, film oxide of a gate electrode material (namely, a material of the scanning line 2) or their laminated films. Also, a micro crystal silicon with impurities such as phosphorus or the like being doped in it can be used as a material instead of amorphous silicon with impurities such as phosphorus or the like being doped in it.

In step 3 (FIGS. 6a and 6b) there is formed a signal line 3 simultaneously with a source electrode 15 and a drain electrode 16 of the TFT 4. The signal line 3 functions as a source electrode 15. The signal line 3 is formed of any one of Cr, Al, Mo, Ta, Cu, Al—Cu, Al—Si—Cu, Ti, W or alloy mainly made of them, or alloy made chiefly of them, or a transparent material of such as ITO or the like or their laminated construction.

In step 4 (FIGS. 7a and 7b) there is formed a passivation film 10 with a transparent insulating film of silicon nitride, silicon oxide and so on. In order to electrically connect the driving electrode 5 with the drain electrode 16, the partial passivation film on the drain electrode 16 of the TFT 4 is removed to form a contact hole 14. At this time, the gate insulating film 9 and the passivation film 10 are removed from the terminal portion of the scanning line 2 at the same time and the passivation film 10 is removed from the terminal portion of the signal line 3 so that the external terminal, the scanning line 2 and the signal line 3 can be connected electrically.

In step 5 (FIGS. 8a and 8b) there is formed the driving electrode 5 and the opposite electrode 6, as an electrode for forming the electric field in a horizontal direction to the substrate face, with any one of Cr, Al, Mo, Ta, Cu, Al—Cu, Al—Si—Cu, Ti, W or alloy mainly composed of at least two thereof, or a transparent material of such as ITO or the like or their laminated construction or their laminated construction including them. The driving electrode 5 is connected with the drain electrode 16 through the contact hole 14. The opposite electrode 6 is connected with the common line 8. The opposite electrodes 6 are superposed through the drain electrode 16 and the passivation film 10 to form the storage capacitance 7 for keeping the electric potential of the driving electrode. By the above five steps, the driving electrode 5 and the opposite electrode 6 are provided in the layer (namely, on the side of the opposite substrate 30) upper than the signal line 3. The TFT array substrate 20 which can apply the horizontal electric field to the substrate face can be made by using a channel etch type TFT with five photolithography processes.

Although the terminal 22 is formed by using the metal of the same layer as that of the scanning line 2 in the process flow of the above described TFT array substrate, a terminal can be formed by using the ITO. The ITO has only to be made of the same layer as that of the scanning line or the signal line 3. Although the signal wiring has been straightly etched, it is desirable to conduct a taper etching operation. When the signal line is formed on Cr under the Al laminated construction, an over etching operation is conducted in Cr when the Cr has been patterned after the Al is patterned, the construction becomes protective in construction, causing disconnection. In order to prevent it, the etching of Al is conducted again after the patterning of the Cr. Retreat the Al from the Cr end face and the protecting construction can be prevented. This etching of the Al can use the taper etching. This method can be adapted when the signal line is formed under the laminated construction of different metals of two types or more of any one of Cr, Al, Mo, Ta, Cu, Al—Cu, Al—Si—Cu, Ti, W or alloy mainly composed of at least two thereof, or transparent materials such as ITO or their laminated construction.

In FIGS. 4a, 4b, 5a, 5b, 6a, 6b, 7a, 7b, 8a and 8b the driving electrode 5 and the opposite electrode 6 can be formed on the same layer and the driving electrode 5 and the signal line 3 are formed at the same time as shown in FIGS. 9a, 9b, 10a, 10b, 11a, 11b, 12a, 12b, 13a and 13b. After forming the passivation film 10 by using the silicon nitride or the like, the opposite electrode 6 can be formed. In this case, the driving electrode 5 and the opposite electrode 6 are formed in a separate layer. A channel passivation film transistor 21 which is one type of TFT 4 can be used, instead of a TFT used for the TFT array substrate shown in FIGS. 4a, 4b, 5a, 5b, 6a, 6b, 7a, 7b, 8a and 8b. FIGS. 14a, 14b, 15a, 15b, 16a, 16b, 17a, 17b, 18a and 18b are views showing a process flow of the TFT array substrate formed by using a channel passivation film transistor 21.

The TFT array substrate shown in FIGS. 14a, 14b, 15a, 15b, 16a, 16b, 17a, 17b, 18a and 18b includes a pixel of the IPS liquid crystal displaying apparatus shown in FIG. 3, and is formed much more in branch layer than the TFT array substrate shown in FIG. 5. This is due to the difference of a producing step (FIGS. 15a and 15b) of forming a scanning line 2, then the continuously depositing the gate insulating film 9, the amorphous silicon, and the channel passivation film to cover the scanning line 2, then forming the channel passivation film 21, ion-injecting the impurities such as P and so on into the amorphous silicon with the channel passivation film 21 as a mask to form an n-layer, and forming the channel passivation film transistor.

In the characteristic construction of the TFT array substrate 20 of the IPS liquid crystal displaying apparatus of Embodiment 1, the driving electrode 5 and the opposite electrode 6 on the array substrate 20 are arranged on a layer (namely, on the side of the opposite substrate 30) upper than the signal line 3. This arrangement allows a step of forming the contact hole 14 and removing the passivation film 10 from the terminal portion of the signal line 3, and a step of removing the insulating film 9 and the passivation film 10 from the terminal portion of the scanning line 2 to carry out at one time. Thus, the number of the masks can be reduced by one and thereby the manufacturing cost can be reduced.

It has been found by forming the driving electrode 5 and the opposite electrode 6 on the layer of the side of the opposite substrate 30 with the signal line 3 and the layer being made different that the influences of the electric field caused by the electric potential difference between the opposite electrode 6, provided adjacently to the signal line 3 on the end portion of the opening 50 shown in FIG. 2, and the signal line 3, as judged from the description to be mentioned later in Embodiment 5. Thus, the opposite electrode of the side end portion of the opening 50 can be made closer to the signal line 3 and the area of the opening 50 can be made larger.

In FIG. 1, the driving electrode 5 and the opposite electrode 6 are directly in contact with the liquid crystal interposed between the TFT array substrate 20 and the opposite substrate 30, so that the liquid crystal can be efficiently driven, and the space between the driving electrode 5 and the opposite electrode 6 can be made wider. Thus, an effect of improving the aperture ratio can be obtained.

Embodiment 2

Figure 19A:
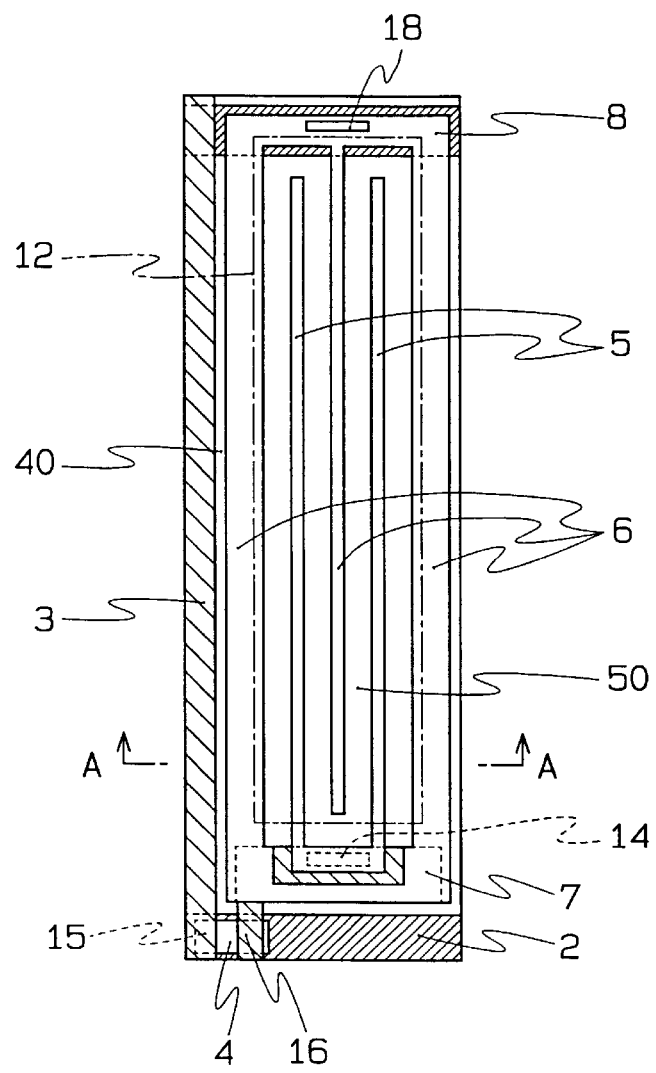
FIGS. 19a and 19b are a plain view and a sectional view showing the construction of one pixel of an IPS liquid crystal displaying apparatus of Embodiment 2 of the present invention.
Figure 19B:
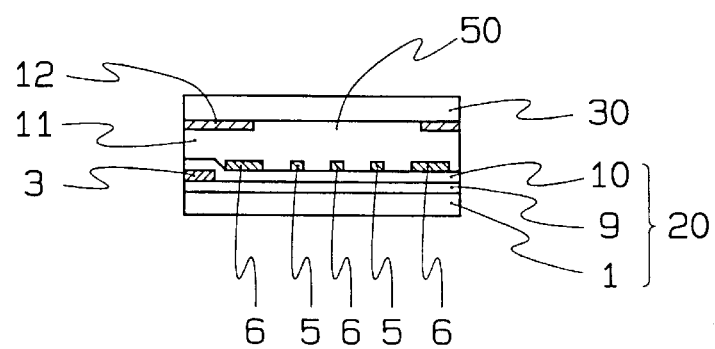
Figures 23A, 23B:
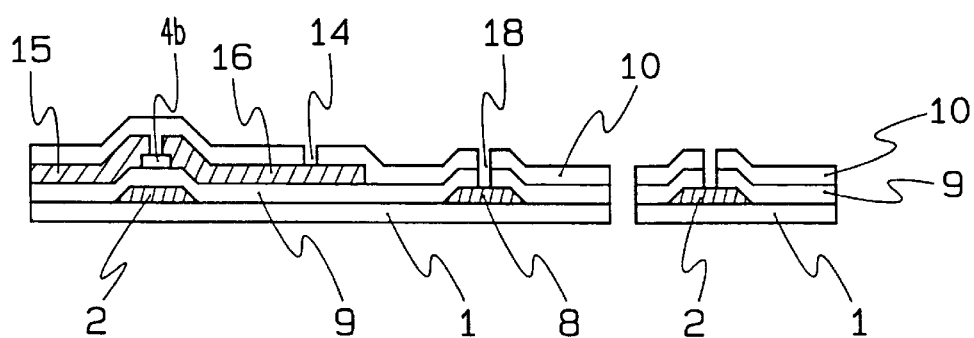
Figures 24A, 24B:
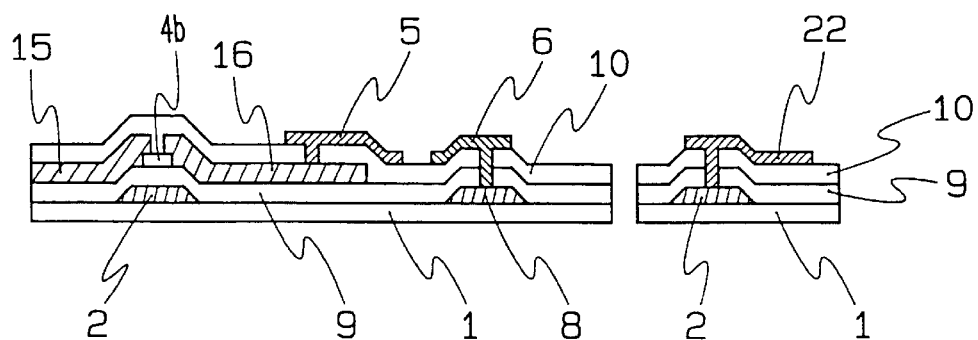

FIGS. 19a and 19b show the construction of the pixel electrode of the liquid crystal displaying apparatus of the embodiment 2 of the present invention. FIG. 19a is its plain view. FIG. 19b is a sectional view taken along a line of A—A of FIG. 19a. FIGS. 20a, 20b, 21a, 21b, 22a, 22b, 23a, 23b, 24a and 24b are views showing the process flow of the array substrate. Referring to the drawing, reference numeral 1 denotes a glass substrate, numeral 2 denotes a scanning line, numeral 3 denotes a signal line, numeral 4 denotes a thin film transistor (TFT), numeral 5 denotes a driving electrode, numeral 6 denotes an opposite electrode, numeral 7 denotes an electrode for forming the storage capacitance, numeral 8 denotes common line, numeral 9 denotes a gate insulating film, numeral 10 denotes a passivation film, numeral 11 denotes a liquid crystal, numeral 12 denotes a BM, numeral 14 denotes a contact hole, numeral 15 denotes a source electrode of a transistor, and numeral 16 denotes a drain electrode. Numeral 18 denotes a through-hole, numeral 20 denotes an array substrate comprising a glass substrate 1, a signal line 3, a driving electrode 5, an opposite electrode 6. Numeral 30 denotes an opposite substrate serving as a display picture face arranged opposite to the array substrate 20. Numeral 40 denotes a slit which is a gap between the signal line 3 and the opposite electrode 6. Numeral 50 denotes an opening of the pixel.

In Embodiment 1, the common line 8 is formed on the same layer as that of the opposite electrode 6. In the embodiment 2, the common line 8 is formed on the same layer as that of the scanning line 2, namely, on the glass substrate 1 as shown in FIGS. 20a, 20b, 21a, 21b, 22a, 22b, 23a, 23b, 24a and 24b. The source electrode 15 is connected with the signal line 3, which is laminated on the scanning line 2 and the common line 8 through the gate insulating film 9. Furthermore, the driving electrode 5 and the opposite electrode 6 are formed through the passivation film 10. The driving electrode 5 is connected with the drain electrode 16 through the contact hole 14. The opposite electrode 6 is connected with the common line 8 through the through-hole 18. The channel passivation film TFT can be used as the TFT 4.

In the IPS liquid crystal displaying apparatus of Embodiment 2, as in Embodiment 1, the driving electrode 5 and the opposite electrode 6 are formed in a layer close to the liquid crystal different from the signal line 3. As the liquid crystal can be driven more efficiently, the space between the driving electrode 5 and the opposite electrode 6 can be made wider to improve the aperture ratio. Since the common line 8 and the scanning line 2 are formed in the same layer, the common line 8 can be formed on the flat glass substrate 1 together with the scanning line 2. Thus, a problem of disconnecting the common line 8 with a level difference portion is prevented from being caused, so as to improve traction defective. Therefore, the reliability of the product is improved. In Embodiment 1, the opposite electrode 6 cannot be made thinner in film due to resistivity of the common line 8, but in Embodiment 2, the film of the opposite electrode 6 can be made thinner. The dispersion of the electrode space is made smaller due to the thinner film of the opposite electrode 6, so as to realize a liquid crystal displaying apparatus which is less in uneven luminance across the whole picture face.

Embodiment 3

Figure 25A:
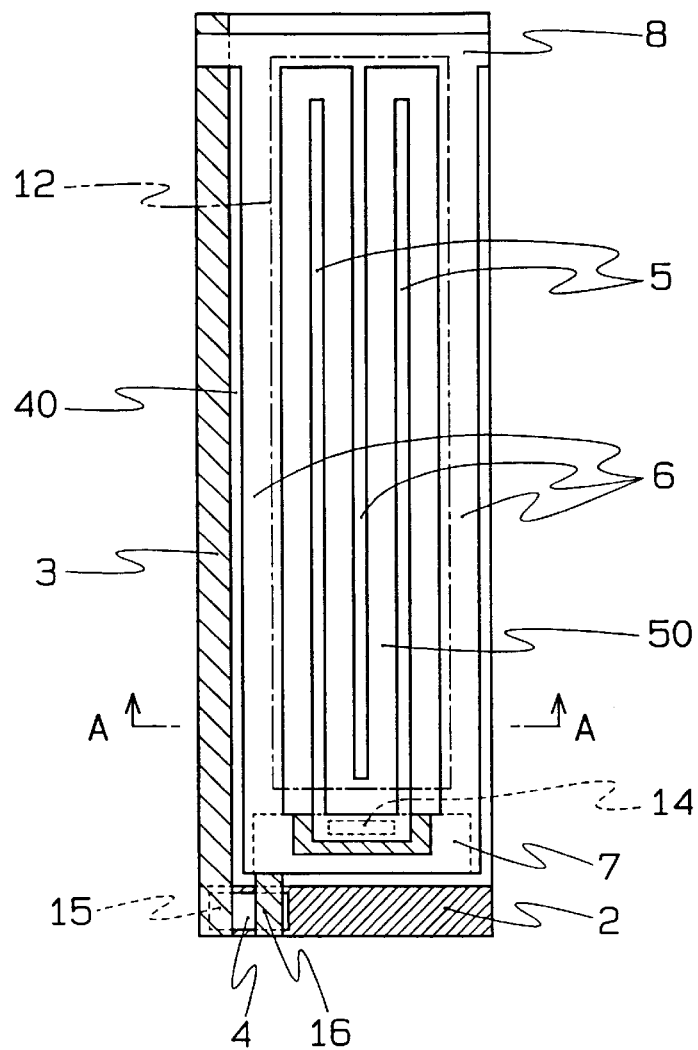
FIGS. 25a and 25b are a plain view and a sectional view showing the construction of one pixel of an IPS liquid crystal displaying apparatus of Embodiment 3 of the present invention.
Figure 25B:
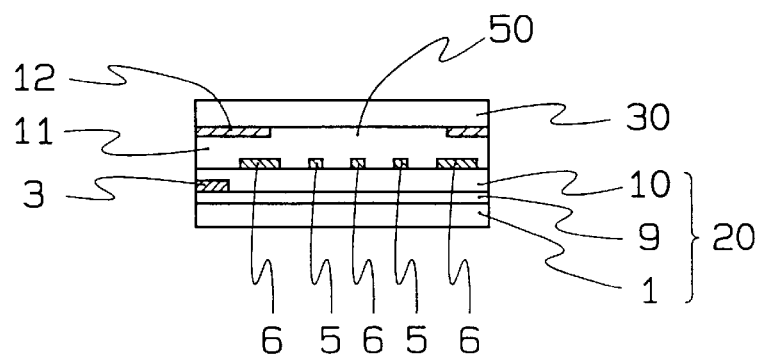
Figures 26A, 26B:
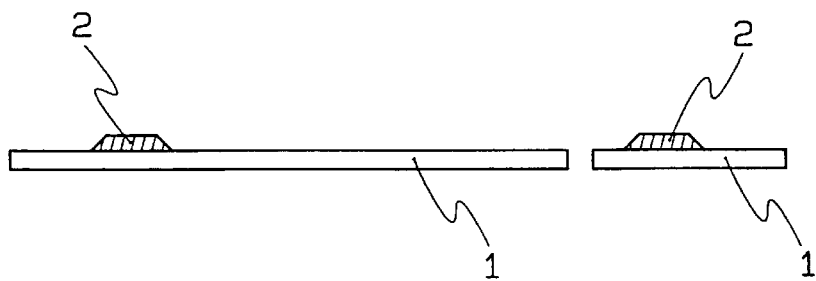
FIGS. 26a, 26b, 27a, 27b, 28a, 28b, 29a, 29b, 30a and 30b depict a process flow of a TFT array substrate of an IPS liquid crystal displaying apparatus of Embodiment 3 of the present invention.
Figures 27A, 27B:
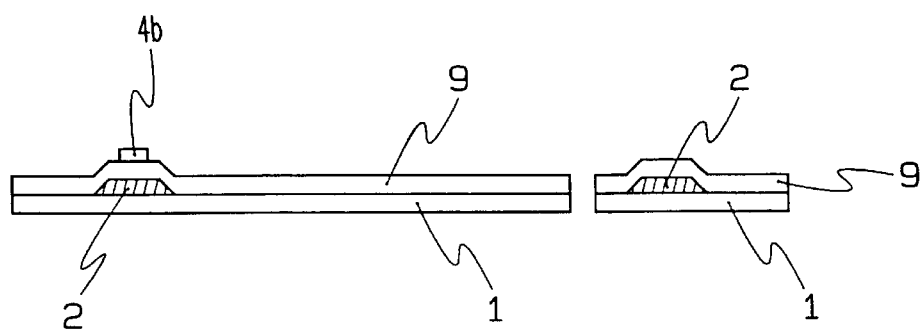
Figures 28A, 28B:
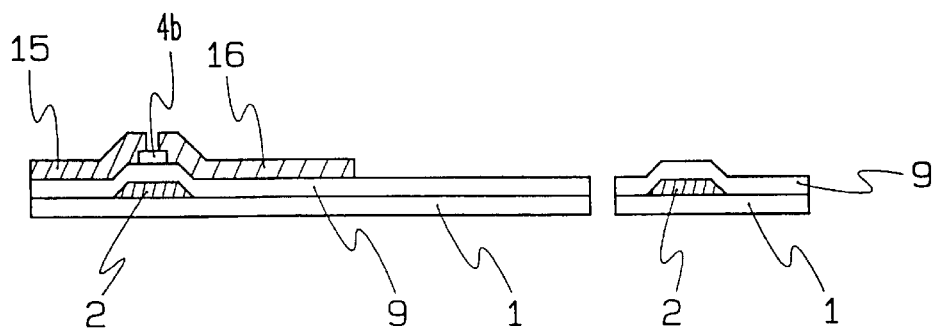
Figures 29A, 29B:
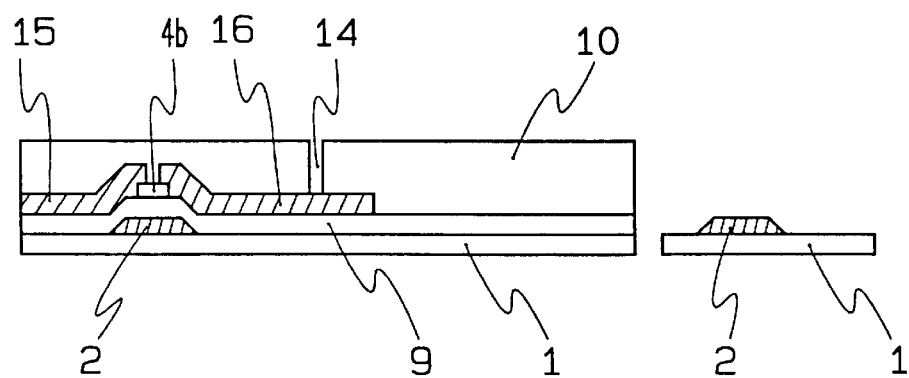
Figures 30A, 30B:
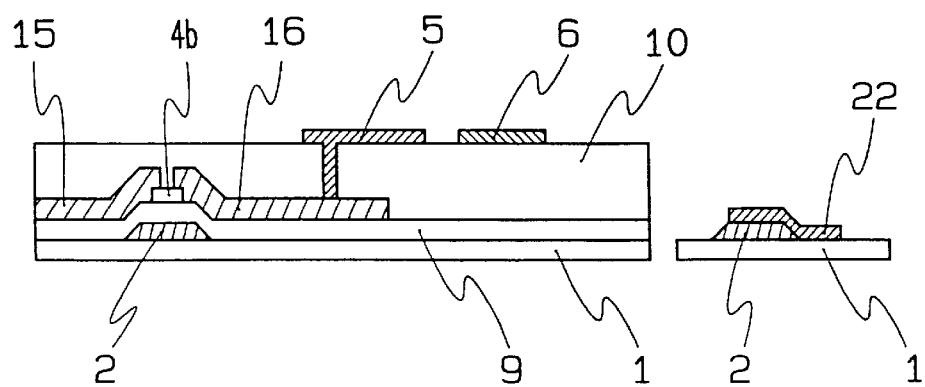

FIGS. 25a and 25b show the construction of one pixel of the liquid crystal displaying apparatus of the embodiment 2 of the present invention. FIG. 25a is its plain view. FIG. 25b is a sectional view taken along a line of A—A of FIG. 25a. FIGS. 26a, 26b, 27a, 27b, 28a, 28b, 29a, 29b, 30a and 30b are views showing the process flow of the array substrate. Referring to the drawing, reference numeral 1 denotes a glass substrate, numeral 2 denotes a scanning line, numeral 3 denotes a signal line, numeral 4 denotes a TFT, numeral 5 denotes a driving electrode, numeral 6 denotes an opposite electrode, numeral 7 denotes an electrode for forming the storage capacitance, numeral 8 denotes common line, numeral 9 denotes a gate insulating film, numeral 10 denotes a passivation film, numeral 11 denotes a liquid crystal, numeral 12 denotes a BM, numeral 14 denotes a contact hole, numeral 15 denotes a source electrode of a transistor, and numeral 16 denotes a drain electrode. Numeral 20 denotes an array substrate comprising a glass substrate 1, a signal line 3, a driving electrode 5, an opposite electrode 6. Numeral 30 is an opposite substrate serving as a displaying picture face arranged opposite to the array substrate 20. Numeral 40 denotes a slit which is a gap between the signal line 3 and the opposite electrode 6. Numeral 50 denotes an opening of the pixel.

In forming the TFT array substrate 20, the passivation film 10 is formed of a transparent insulation film such as silicon nitride, silicon oxide. The surface of the passivation film 10 is not flat and has a level difference. In Embodiment 3, the passivation film 10 is made flat by removing the level difference of the surface of the passivation film 10, as shown in FIG. 25b and FIGS. 26a, 26b, 27a, 27b, 28a, 28b, 29a, 29b, 30a and 30b, by forming with the use of a material such as acrylic melamine, acrylic epoxy or the like having a function of flattening the surface of the layer to be formed.

The IPS liquid crystal displaying apparatus of Embodiment 3 can equally constitute with precision the gap between the surface of the array substrate across the whole displaying picture face and the opposite substrate 30 by flattening the surface of the passivation film 10. A liquid crystal displaying apparatus which is less in uneven brilliance across the whole picture face can be made. The fraction defective which is caused due to cracks or the like in the level difference portion of the passivation film 10 can be made smaller to improve the yield. A high quality liquid crystal displaying apparatus can be realized which is applied equally in rubbing treatment necessary to the orientation of the liquid crystal by the flattening operation and is less in orientation disturbing.

As in Embodiment 1, the driving electrode 5 and the opposite electrode 6 are provided closer to the liquid crystal than a formed layer of the signal line 3, with an effect of improving the aperture ratio, because the liquid crystal can be driven efficiently, and the space between the driving electrode 5 and the opposite electrode 6 can be widened.

Embodiment 4

Figure 31A:
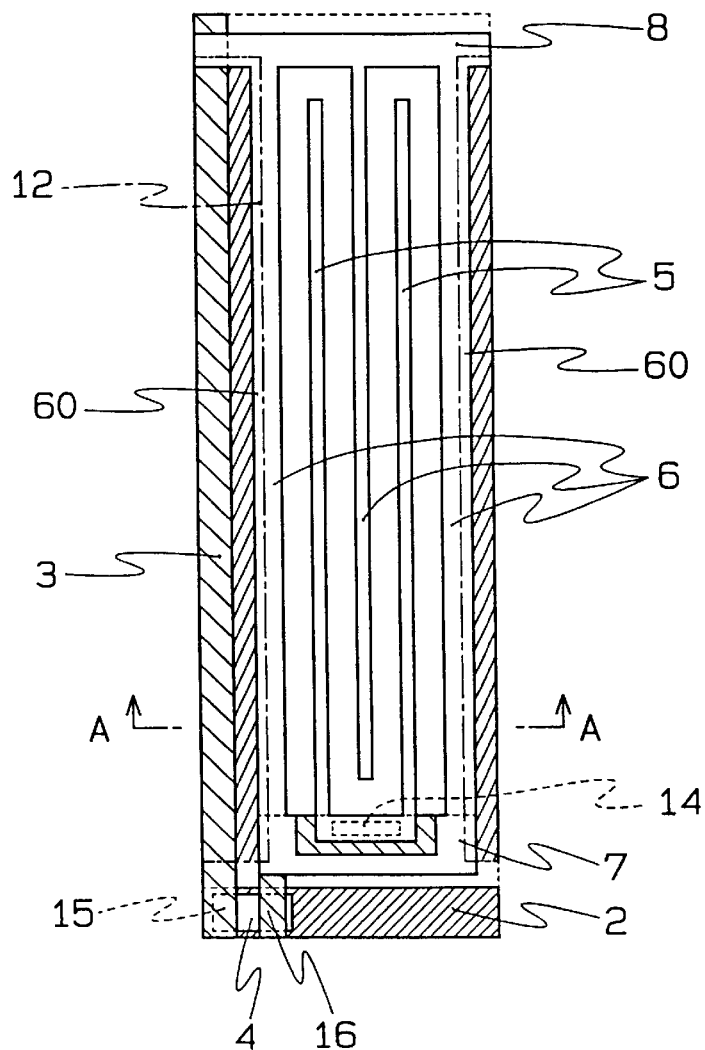
FIGS. 31a and 31b are a plain view and a sectional view showing the construction of one pixel of an IPS liquid crystal displaying apparatus of Embodiment 4 of the present invention.
Figure 31B:
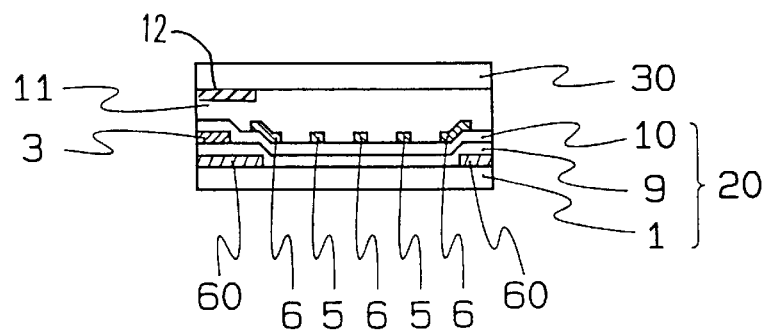

FIGS. 31a and 31b show the construction of one pixel electrode of the liquid crystal displaying apparatus of Embodiment 4 of the present invention. FIG. 31a is its plain view. FIG. 31b is a sectional view taken along a line of A—A of FIG. 31a. Referring to the drawing, reference numeral 1 denotes a glass substrate, numeral 2 denotes a scanning line, numeral 3 denotes a signal line, numeral 4 denotes a TFT, numeral 5 denotes a driving electrode, numeral 6 denotes an opposite electrode, numeral 7 denotes an electrode for forming the storage capacitance, numeral 8 denotes common line, numeral 9 denotes a gate insulating film, numeral 10 denotes a passivation film, numeral 11 denotes a liquid crystal, numeral 14 denotes a contact hole, numeral 15 denotes a source electrode of, a TFT 4, and numeral 16 denotes a drain electrode of the TFT. Numeral 20 denotes an array substrate composing a glass substrate 1, a signal line 3, a driving electrode 5, an opposite electrode 6. Numeral 30 denotes an opposite substrate serving as a displaying picture face arranged opposite to the array substrate 20. Numeral 60 denotes a light shielding film provided on the glass substrate 1.

Embodiment 4 is characterized by formation of a light shielding film 60 on a glass substrate 1, which shields the leakage light from a slit 40 (see FIG. 43a) between the signal line 3 and the opposite electrode 6 in the pixel structure of the liquid crystal displaying apparatus of Embodiment 1 through Embodiment 3. The structure of the liquid crystal displaying apparatus of Embodiment 4 will be described in accordance with FIG. 31a and FIG. 31b.

A light shielding film 60 is formed on the glass substrate 1 in FIG. 31b. Although not shown in FIG. 31b, the scanning line 2 is also formed on the same layer as that of the light shielding film 60. The scanning line 2 functions as a gate electrode of the TFT 4. A gate insulating film 9 is laminated on the scanning line 2 and the light shielding film 60. A signal line 3, in a position superposed on the light shielding film 60, on the gate insulating film 9. The TFT 4 is also formed on the gate insulating film 9. The TFT 4 can use either of the channel etch TFT and the channel passivation film TFT. The source electrode 15 of the TFT 4 and the drain electrode 16 are also formed in the same layer as that of the signal line 3, so as to laminate the passivation film 10. Continuously a contact hole 14 is formed in the passivation film 10. The driving electrode 5 provided on the passivation film 10 and the drain electrode of the TFT 4 provided on the gate insulating film 9 are connected with each other through the contact hole 14.

The opposite electrode 6 is formed on the passivation film 10 as in the driving electrode 5. In a position where the opposite electrode 6 is superposed on the light shielding film 60, it is superposed through the drain electrode 16 and the passivation film 10 to form the storage capacitance 7 for keeping the electric potential of the driving electrode 5. The opposite electrode 6 is connected with the common line 8 provided on the same layer. Broken lines are shown on both the end portions of the pixel of FIG. 31a. The broken lines show a position in FIG. 31a of the light shielding film 60 provided on the glass substrate 1 shown in FIG. 31b. As shown by the broken lines, it is found out that a slit 40 (see FIG. 43a) is covered between the signal line 3 and the opposite electrode 6 by formation of the opposite electrodes 6 at both the ends to be superposed on the light shielding film 60.

In Embodiment 4, the driving electrode 5 and the opposite electrode 6 are formed on the passivation film 10. The driving electrode 5 and the signal line 3 are formed simultaneously on the gate insulating film 9 and the opposite electrode 6 can be formed after the passivation film has been formed by using silicon nitride or the like. In this case, the driving electrode 5 and the opposite electrode 6 are formed in a different layer. In Embodiment 4, the light leaking from the slit 40 (not shown) between the signal line 3 and the opposite electrode 6 is not caused by formation of the light shielding film 60 on the glass substrate 1. Thus, the width of the BM 12 of the opposite substrate 30 can be made narrower and the light shielding in the direction of the signal line 3 do not have to be conducted by the BM 12. Therefore, the BM 12 can be omitted so that the opening portion can be provided larger.

The liquid crystal displaying apparatus is manufactured by superposed combination between the TFT array substrate and the opposite substrate with a color filter attached to it, including the liquid crystal 11 into between these substrates, and connecting the driving circuit. Superposed errors are sometimes caused by a step of superposing the TFT array substrate and the opposed substrate. Thus, in the BM, the light shielding area has to be provided larger (see FIG. 43a), considering the superposed errors, so as to positively shield the leakage light from the slit 40 of the TFT array substrate 20. The transmission portion of the slit leakage light can be shielded in light positively by provision of the light shielding film 60 on the TFT array substrate 20. The superposed error between the TFT array substrate and the opposite substrate is not necessary to be considered. Thus, the BM 12 can be provided into the size of a necessary minimum, and thereby the opening portion can be made larger.

In the IPS liquid crystal displaying apparatus of Embodiment 4, the driving electrode 5 and the opposite electrode 6 are provided in a layer close to the liquid crystal as in the IPS liquid crystal displaying apparatus of Embodiment 1. The liquid crystal can be driven effectively and the space between the electrodes can be widened, with an effect of improving the aperture ratio.

Embodiment 5

Figure 32A:
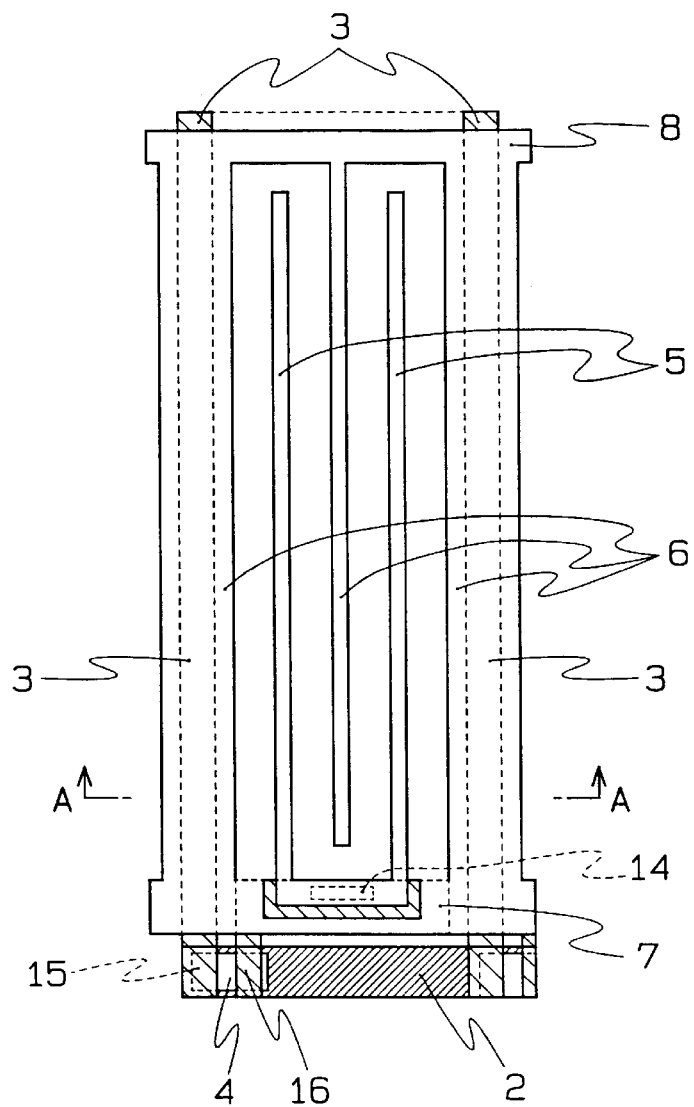
FIGS. 32a and 32b are a plain view and a sectional view showing the construction of one pixel of an IPS liquid crystal displaying apparatus of Embodiment 5 of the present invention.
Figure 32B:
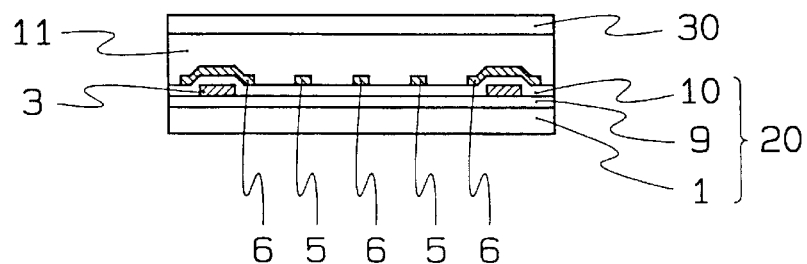

A construction of one pixel of the IPS liquid crystal displaying apparatus of Embodiment 5 is depicted in FIGS. 32a and 32b. The plain view thereof is depicted in FIG. 32a. FIG. 32b is a sectional view taken along a line A—A of FIG. 32a. Referring to the drawing, reference numeral 1 denotes a glass substrate, numeral 2 denotes a scanning line, numeral 3 denotes a signal line, numeral 4 denotes a thin film transistor (TFT), numeral 5 denotes a driving electrode, numeral 6 denotes an opposite electrode, numeral 7 denotes an electrode for forming the storage capacitance, numeral 8 denotes common line, numeral 9 denotes a gate insulating film, numeral 10 denotes a passivation film, numeral 11 denotes a liquid crystal, numeral 12 denotes a BM, numeral 14 denotes a contact hole, numeral 15 denotes a source electrode of a transistor, and numeral 16 denotes a drain electrode of a transistor. Numeral 20 denotes an array substrate comprising glass substrate 1, a signal line 3, a driving electrode 5, an opposite electrode 6. Numeral 30 denotes an opposite substrate serving as a displaying picture face arranged opposite to the array substrate 20.

Figure 33:
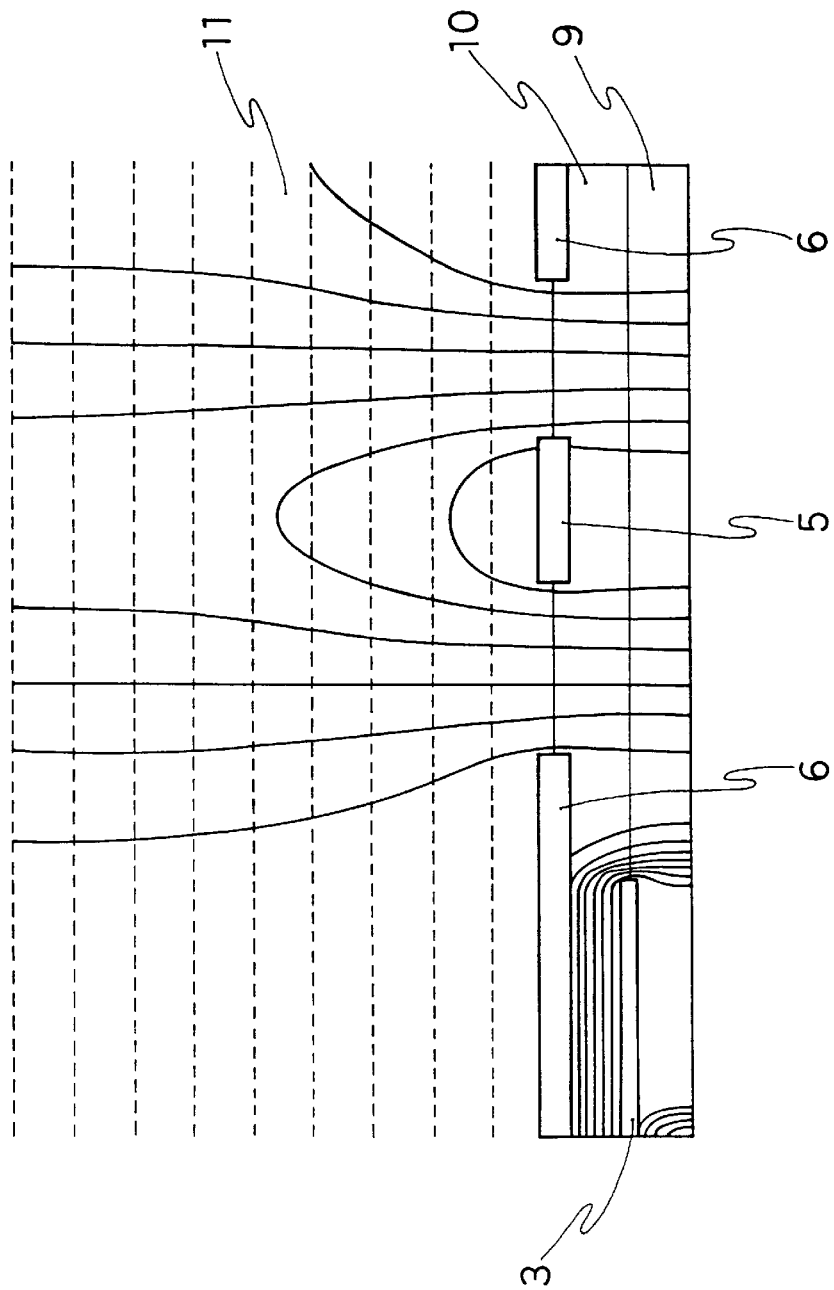
FIG. 33 is a view showing the potential distribution when the driving electrode and the opposite electrode are in a layer higher than the upper layer.

Embodiment 5 is characterized by formation of the driving electrode 5 and the opposite electrode 6, as in Embodiment 1, in a layer upper than the signal line 3, and furthermore, the formation of the opposite electrode 6 to cover the signal line 3, so as to make it hard to receive the influences of the leakage electric field from the signal line 3 but further, not to cause the leakage light from the slit 40 (see FIG. 43a) between the signal line 3 and the opposite electrode 6. FIG. 33 depicts the simulated results of changes in electric potential caused between the driving electrode 5 formed to cover the signal line 3 and the opposite electrode 6 formed in the same layer as that of the driving electrode 5. FIG. 33 is the calculated electric potential in the window upper portion or lower portion when a white window has been displayed on the half tone of 50% in relative transmission factor.

Figure 46:
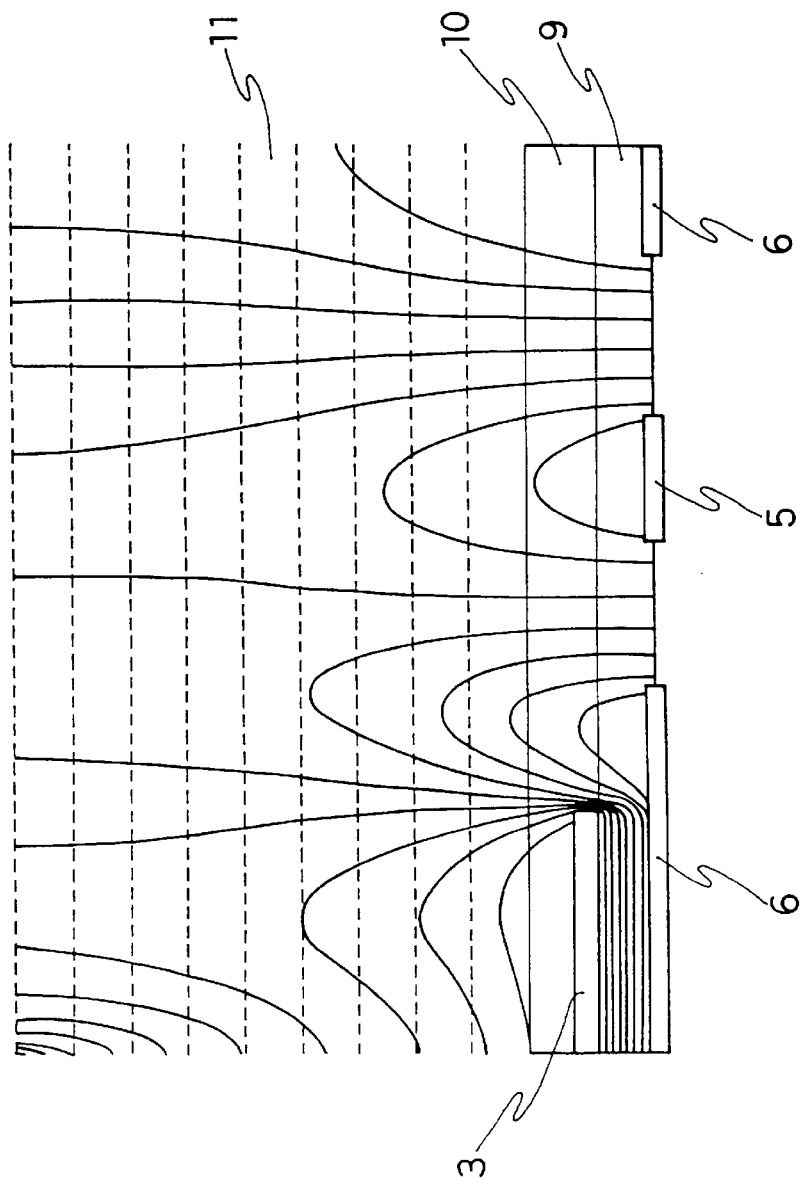
FIG. 46 is an explanatory view showing the electric potential distribution when the driving electrode and the opposite electrode are in a layer lower than the signal line.
Figure 47:
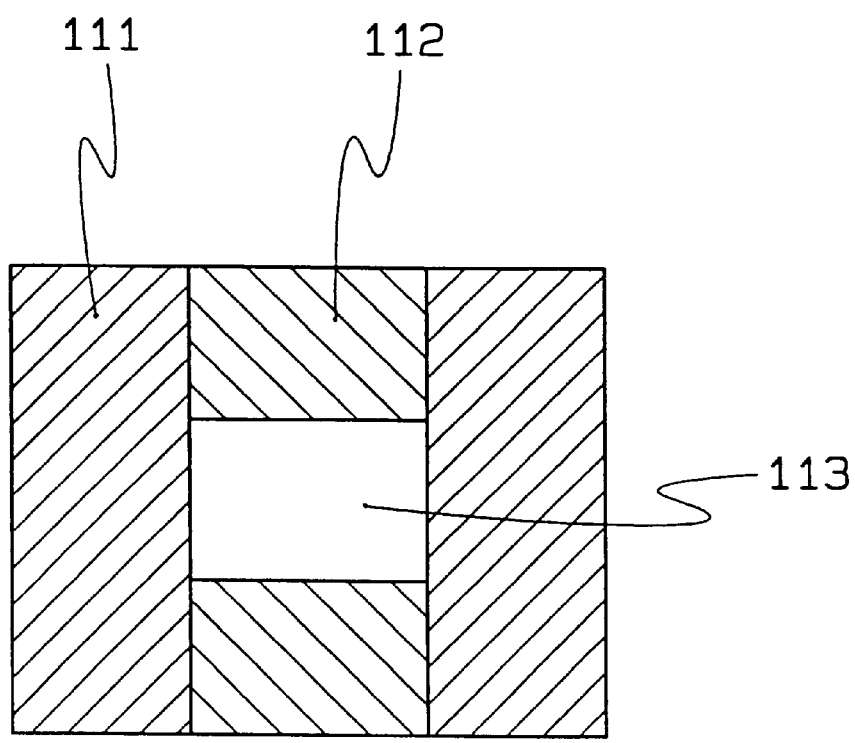
FIG. 47 an explanatory a view showing a crosstalk.

Between FIG. 46 and FIG. 33 there is shown the electric potential distribution in the TFT array substrate of the conventional IPS liquid crystal displaying apparatus having the driving electrode 5 and the opposite electrode 6 in the layer lower than the signal line 3. In FIG. 33, the electric field to be caused by the electric potential difference between the signal line 3 and the opposite electrode 6 is shielded by the opposite electrode 6 arranged on the upper portion to cover the signal line 3. Thus, the electric potential distribution is approximately symmetrical in the area close to the signal line 3 of the opening 50 and the area separated from the signal line 3.

In this manner, the TFT array substrate 20 of the IPS liquid crystal displaying apparatus of Embodiment 5 can reduce remarkably the influences, of the electric field to be caused between the signal line 3 and the opposite electrode 6, with respect to the electric field to be caused between the driving electrode 5 and the opposite electrode 6 by formation of the driving electrode 5 and the opposite electrode 6 in a layer upper than the signal line 3, and formation of the opposite electrode 6 to cover the signal line 3. The opposite electrode 6 of the end of the opening 50 can be made much closer to the signal line 3, thus making it possible to widen the total area of the opening 50 wider.

As the opposite electrode 6 is formed to cover the signal line 3, the leakage light can be shield, thus making it possible to remove the BM 12. As the area of the opening portion 50 can be widened, a liquid crystal displaying apparatus higher in brilliance can be provided. As a step of providing the BM 12 can be reduced, the productivity can be improved, and a liquid crystal displaying apparatus can be produced with lower cost. As in Embodiment 1, the driving electrode 5 and the opposite electrode 6 can be formed in a layer close to the liquid crystal. The liquid crystal can be driven efficiently and the space between the electrodes can be widened, thus improving the aperture ratio.

Embodiment 6

Figure 34A:
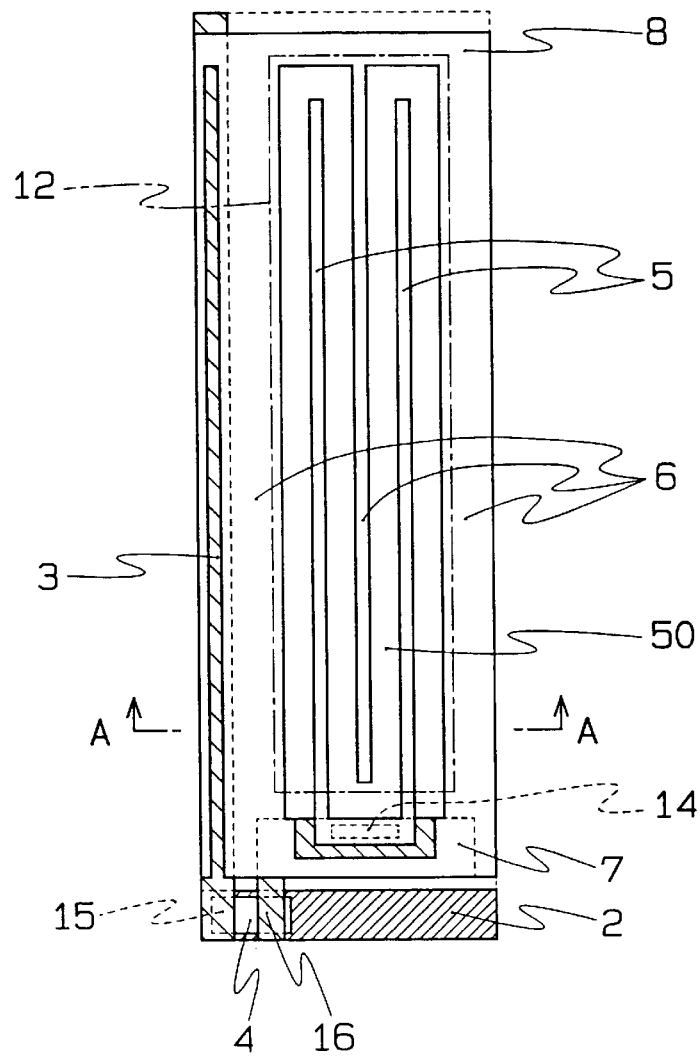
FIGS. 34a and 34b are a plain view and a sectional view showing the construction of one pixel of an IPS liquid crystal displaying apparatus of Embodiment 6 of the present invention.
Figure 34B:
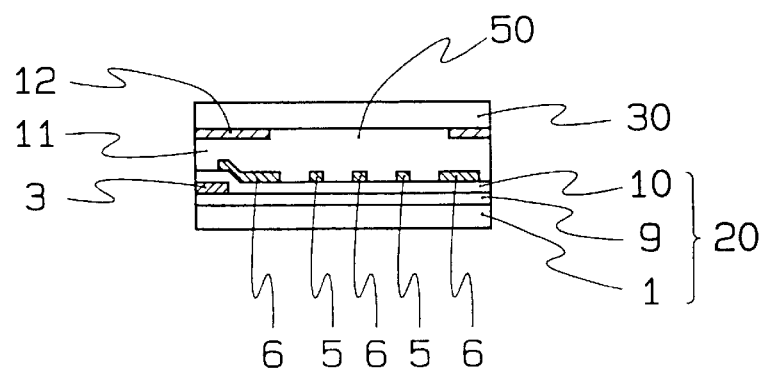

FIGS. 34a and 34b show the construction of one pixel of the IPS liquid crystal displaying apparatus of Embodiment 6. FIG. 34a is its plain view. FIG. 34b is a sectional view taken along a line of A—A of FIG. 34a. The construction of the pixel of the IPS liquid crystal displaying apparatus of Embodiment 6 shown in FIGS. 34a and 34b are fundamentally similar to that of the pixel of the IPS displaying apparatus of Embodiment 5 shown in FIG. 12, the description thereof is omitted. Although the opposite electrode 6 of the construction for completely covering the signal line 3 is provided in Embodiment 5, the opposite electrode 6 of the construction for covering one portion of the signal line 3 can be used as in the opposite electrode 6 of the pixel of the IPS liquid crystal displaying apparatus of Embodiment 6 shown in FIGS. 34a and 34b.

According to Embodiment 6, the opposite electrode 6 is adapted to form one portion of the signal line 3. Thus, the electric field for generating the electric potential difference between the signal line 3 and the opposite electrode 6 can reduce the influences for influencing the electric field between the driving electrode 5 and the opposite electrode 6, and the leakage light passing through the slit 40 between the signal line 3 and the opposite electrode 6 can be shielded. It is possible to make the width of the BM 12 narrower or remove the BM 12. A liquid crystal displaying apparatus which is wider in an opening and higher in luminance can be realized. Also, a process of providing the BM 12 can be reduced by removing the BM 12, so as to improve the productivity. As a superposed area of the signal line 3 and the opposite electrode 6 becomes smaller, the short-circuit defect between the signal line 3 and the opposite electrode 6 can be reduced. As the superposed area of the signal line 3 and the opposite electrode 6 becomes smaller, the capacitance between the signal line 3 and the opposite electrode 6 can be made smaller, so that the load of the wiring can be reduced, making it easier to do a driving operation.

Embodiment 7

Figure 35A:
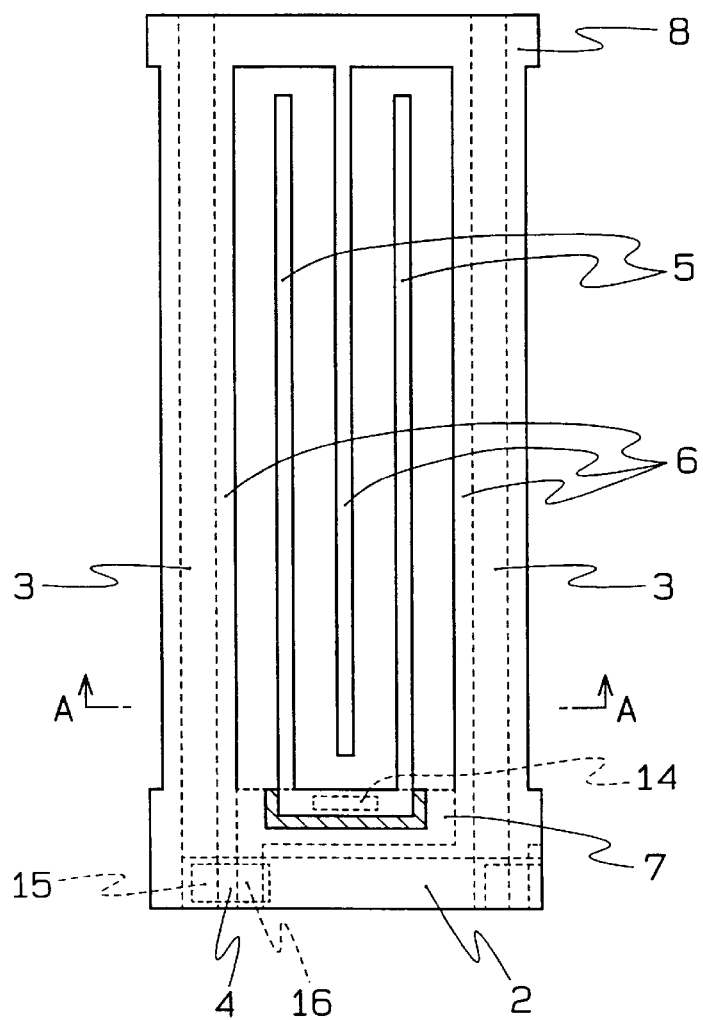
FIGS. 35a and 35b are a plain view and a sectional view showing the construction of one pixel of an IPS liquid crystal displaying apparatus of Embodiment 7 of the present invention.
Figure 35B:
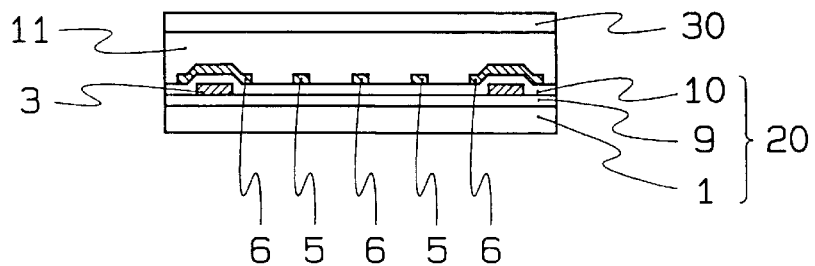

FIGS. 35a and 35b show the construction of one pixel of the IPS liquid crystal displaying apparatus of Embodiment 7. FIG. 35a is its plain view. FIG. 35b is a sectional view taken along a line of A—A of FIG. 35a. As the construction of the pixel of the IPS liquid crystal displaying apparatus of Embodiment 7 shown in FIGS. 35a and 35b are fundamentally similar to that of the pixel of the IPS type displaying apparatus of the embodiment 5 shown in FIGS. 34a and 34b, the description thereof is omitted. Embodiment 7 is characterized by enlarging the opposite electrode 6 up to above the scanning line 2, and connecting the opposite electrode 6 of the other pixel adjacent to the pixel by using the opposite electrode 6, in the pixel construction of the liquid crystal displaying apparatus in, for example, Embodiment 6 as shown in FIGS. 34a and 34b.

By using such a construction, the width of the opposite electrode 6 becomes thicker so that the resistivity of the opposite electrode 6 is lowered and the load is reduced, making it easier to conduct a driving operation. As the electric potential is supplied from the opposite electrode 6 on the scanning line 2 even when the common line 8 is disconnected, it does not become defective on display. The reliability of the product is improved. The construction of the opposite electrode 6 in Embodiment 7 can be adapted to not only to Embodiment 7, but also the other embodiments.

Embodiment 8

Figure 36:
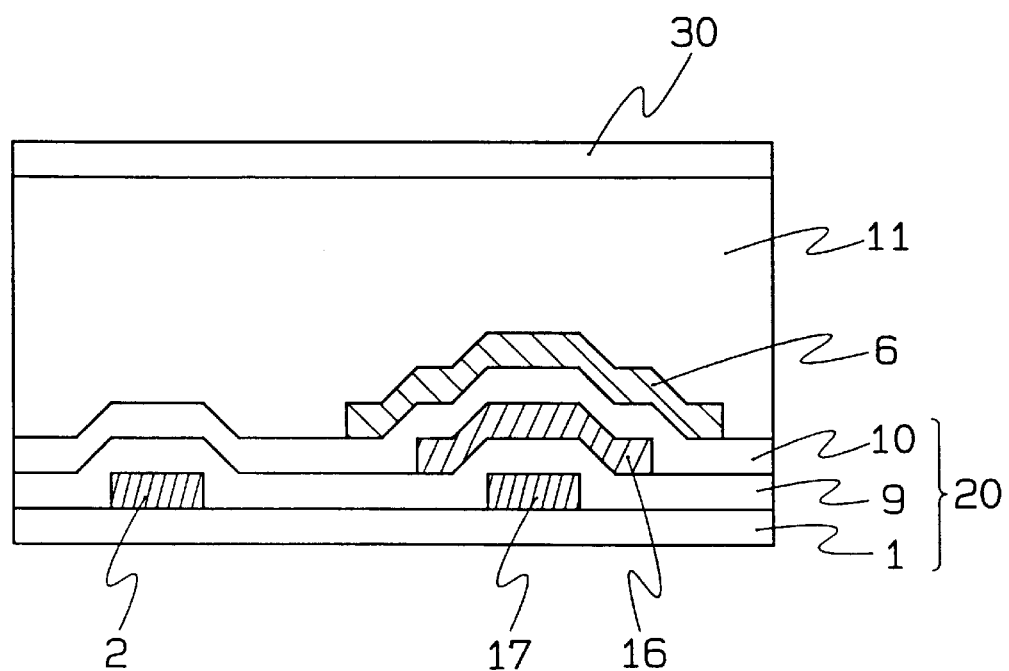
FIG. 36 is a sectional view showing the construction of one pixel of an IPS liquid crystal displaying apparatus of Embodiment 8 of the present invention.
Figure 44:
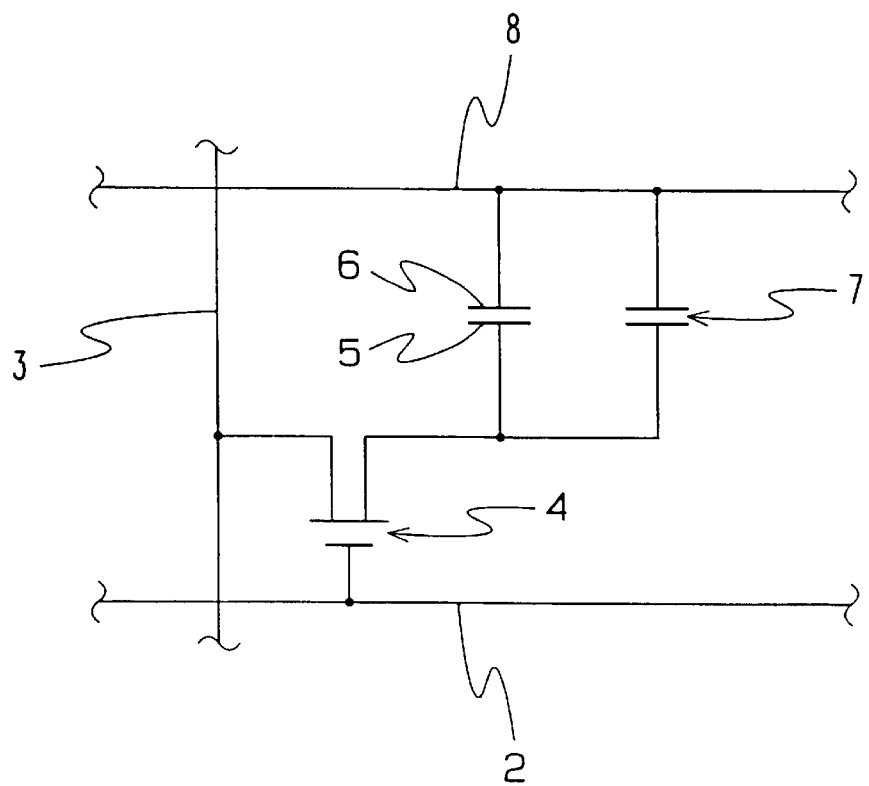
FIG. 44 shows an equivalent circuit of one pixel of the conventional IPS liquid crystal displaying apparatus.
Figure 45:
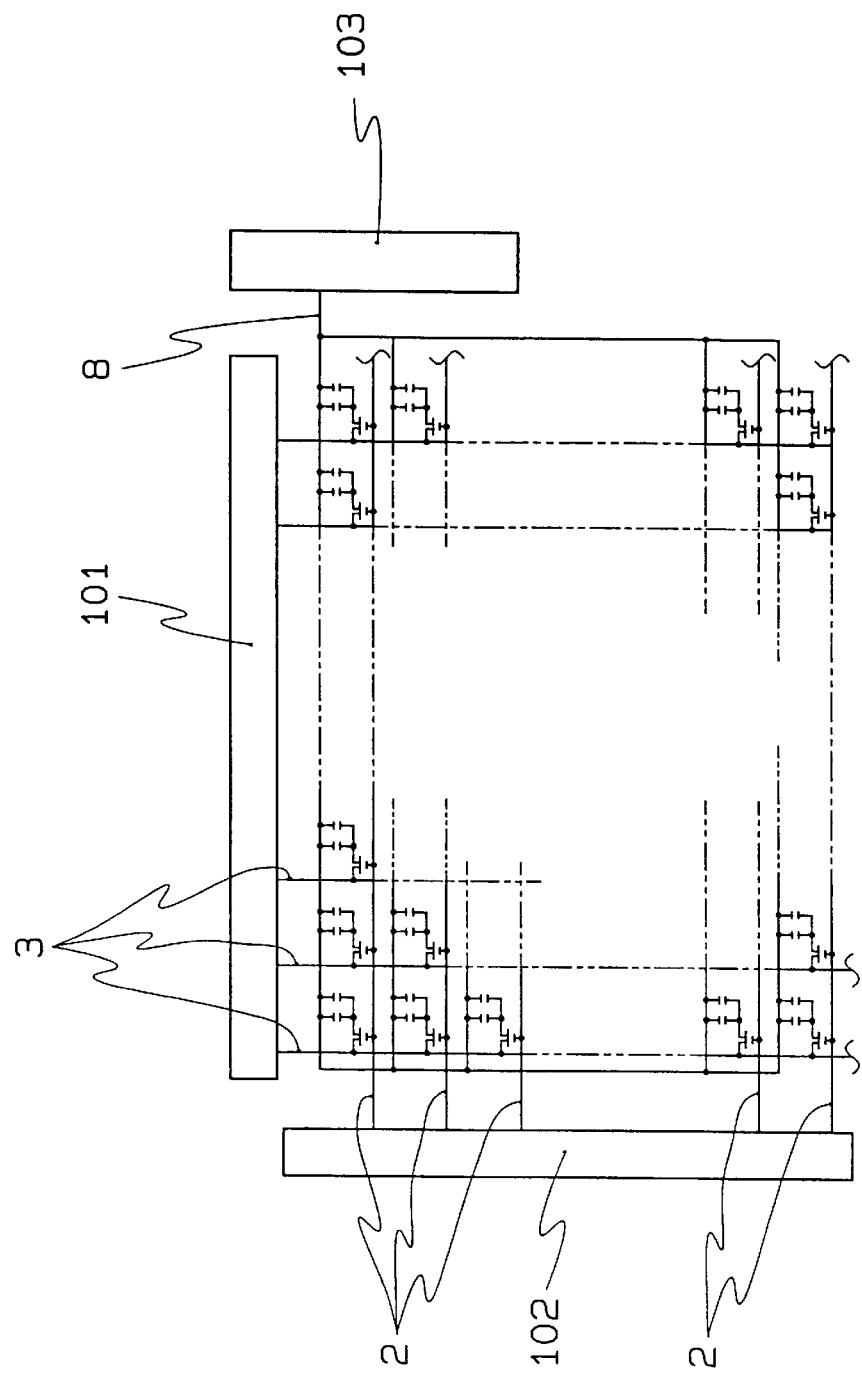
FIG. 45 is a block diagram showing the construction of the conventional IPS liquid crystal displaying apparatus.

FIG. 36 shows the sectional construction of the storage capacitance portion of one pixel of the liquid crystal displaying apparatus of Embodiment 8 of the present invention. Referring to the drawing, reference numeral 17 denotes an electrode for increasing the storage capacitance formed on the glass substrate 1. Numeral 16 denotes a drain electrode of the TFT. The storage capacitance portion of the liquid crystal liquid displaying apparatus of Embodiment 8 as shown in the drawing is superposed and laminated on a layer (for example, the layer of the scanning line 2) separate from the drain electrode 16 of the TFT through the gate insulating film 9. It can make the area of the electrode for forming the storage capacitance smaller by the laminating construction of the electrode of the storage capacitance portion. As a result, the opening 50 (not shown) of the pixel can be made wider.

Embodiment 9

FIGS. 37a, 37b, 38a, 38b, 39a, 39b, 40a, 40b, 41a, 41b, 42a and 42b are views showing the process flow of the TFT array substrate of the Embodiment 9. Referring to FIGS. 37a, 37b, 38a, 38b, 39a, 39b, 40a, 40b, 41a, 41b, 42a and 42b, reference numeral 1 denotes a glass substrate, numeral 2 denotes a scanning line, numeral 3 is a signal line, numeral 4 denotes a TFT, numeral 5 denotes a driving electrode, numeral 6 denotes an opposite electrode, numeral 8 denotes common line, numeral 9 denotes a gate insulating film, numeral 10 denotes a passivation film, numeral 14 denotes a contact hole, numeral 15 denotes a source electrode of a transistor, and numeral 16 denotes a drain electrode of a transistor. Numeral 19 denotes a second passivation film. Numeral 20 denotes an array substrate comprising a glass substrate 1, a signal line 3, a driving electrode 5, an opposite electrode 6.

In Embodiment 9, a second passivation film 19 is formed on the TFT array substrate shown in FIGS. 4a through 18a and FIGS. 4b through 18b. The construction of one pixel of the liquid crystal displaying apparatus of Embodiment 9 is similar to Embodiment 1. A method of manufacturing the liquid crystal displaying apparatus of the embodiment will be described hereinafter. The process flow of the TFT array substrate in Embodiment 9 is similar to Embodiment 1 up to a step for forming the opposite electrode 6. In Embodiment 9, a second passivation film 19 is formed on the top layer of the opposite electrode 6.

By forming the second passivation film 19 between the driving electrode 5 and the opposite electrode 6, the short circuit, between the driving electrode 5 and the opposite electrode 6, due to foreign materials can be prevented to improve the yield. As the level difference between the driving electrode 5 and the opposite electrode 6 can be made flat, a high quality of liquid crystal displaying apparatus can be realized where the rubbing treatment necessary for the liquid crystal orientation is equally applied and is less in orientation disturbing.

According to the IPS liquid crystal displaying apparatus of the present invention, the driving electrode and the opposite electrode are formed in a layer close to the liquid crystal different to the signal line. The driving electrode and the opposite electrode are formed in a layer close to the liquid crystal so that the liquid crystal can be driven more efficiently. Thus, the space between the driving electrode and the opposite electrode can be widened, so as to improve the aperture ratio.

According to the IPS liquid crystal displaying apparatus of the present invention, at least the opposite electrode of the driving electrode and the opposite electrode is formed in a layer close to the liquid crystal different from a layer where the signal line is formed, so that influences given by the electric field to be caused by the electric potential difference between the signal line and the opposite electrode.

According to the IPS liquid crystal displaying apparatus of the present invention, the opposite electrode is formed to cover one portion or all the portion of the signal line. The electric field to be caused by the electric potential difference between the signal line and the opposite electrode influences the electric field to be caused between the driving electrode of the opening and the opposite electrode, thereby restraining a problem of deteriorating the picture quality on the displaying from being caused. Thus, the liquid crystal display of high picture quality can be made and the leakage light from between the signal line for making the black light a light source, and the opposite electrode can be shielded accurately. The BM can be removed, so as to improve the aperture ratio.

According to the IPS liquid crystal displaying apparatus of the present invention, at least the opposite electrode is provided in a layer different from the scanning line so as to cover one portion or all the portion of the scanning line. The opposite electrode of the other pixel can be connected by the opposite electrode, so that the width of the opposite electrode can be made thicker without reduction in the area of the opening. Accordingly, the resistivity of the opposite electrode can be lowered to reduce the load of the wiring. As the electric potential can be fed from the opposite electrode on the scanning line when the common line is disconnected, the reliability can be increased by restraining the defects on the displaying from being caused.

According to the IPS liquid crystal displaying apparatus of the present invention, the common line and the scanning line are provided on the same layer and the single line is provided on a layer closer to the opposite substrate than to the common lineand the scanning line. The defect to be caused in the stage difference portion can be restrained.

According to the IPS liquid crystal apparatus of the present invention, a passivation film whih formed approximately flat in surface where the TFT array substrate comes into contact with the liquid crystal. Thus, the gap between the array substrate surface and the opposite substrate across all the display picture surface is equally constructed with precision. The rubbing treatment necessary for the liquid crystal orientation is equally applied and the orientation disturbing can be reduced. The liquid crystal displaying apparatus which is less in uneven luminance across the whole picture face can be realized. The fraction defective which is caused by cracks in the stage difference portion of the passivation film becomes smaller, so as to improve the yield.

In the IPS liquid crystal displaying apparatus of the present invention, a TFT array substrate is provided having a light shielding means formed to have the signal line and the opposite electrode superposed. The leakage light for transmitting through the slit can be shielded, and thus the BM provided on the opposite substrate becomes unnecessary. The superposed errors are not necessary to be considered in the superposition between the TFT array substrate and the opposite substrate in determining the size of the light shielding means. Thus, the size of the light shielding means can be made that of a necessary minimum, so as to improve the aperture ratio.

According to the in plain switching type liquid crystal displaying apparatus of the present invention, a TFT array substrate formed to be superposed with a TFT, a driving electrode, and a storage capacitance increasing electrode being different in layer. The area of the electrode for forming the storage capacitance can be made smaller and the opening portion of the pixel can be made wider correspondingly, and the liquid crystal displaying apparatus higher in luminance can be realized.

Though several embodiments of the present invention are described above, it is to be understood that the present invention is not limited only to the above-mentioned, various changes and modifications may be made in the invention without departing from the spirit and scope thereof.

What we claim is:

1. An IPS liquid crystal displaying apparatus, comprising:
    a TFT array substrate;
    an opposite substrate opposed to said TFT array substrate;
    a liquid crystal interposed between said TFT array substrate and said opposite substrate, said TFT array substrate comprising:
        a glass substrate,
        a gate insulating film formed on said glass substrate, and
        a passivation film formed on said gate insulating film;
    a plurality of scanning lines configured to transmit a plurality of scanning signals and formed on said glass substrate;
    a plurality of signal lines configured to transmit a plurality of image signals and formed on said gate insulating film;
    a plurality of common lines configured to transmit a plurality of common signals;
    a plurality of pixels arranged in a grid like pattern by crossing said plurality of scanning lines with said plurality of signal lines;
    a plurality of TFTs implementing a switching operation of said plurality of image signals based on said plurality of image signals and said plurality of scanning signals;
    a plurality of driving electrodes formed on said passivation film and connected with said plurality of TFTs;

a plurality of opposite electrodes formed on said passivation film, each of said plurality of opposite electrodes opposing each of said plurality of driving electrodes; and a plurality of common lines configured to connect each of said plurality of opposite electrodes in each of said plurality of pixels, wherein each of said plurality of driving electrodes is configured to drive said liquid crystal by generating an electric field which is parallel to a face of said TFT array substrate, between said plurality of driving electrodes and said plurality of opposite electrodes, wherein each of said plurality of opposite electrodes is configured to be connected with each of said plurality of said common lines, and wherein one of said plurality of opposite electrodes covers at least a portion of said plurality of signal lines, which is parallel to a respective one of said opposite electrodes.

* * * * *